(12) United States Patent
Tatge et al.

(10) Patent No.: US 11,283,814 B2
(45) Date of Patent: Mar. 22, 2022

(54) DISTRIBUTED TRANSACTION-BASED SECURITY AND TRACKING OF MACHINE AND AGRONOMIC DATA

(71) Applicant: Farmobile LLC, Leawood, KS (US)

(72) Inventors: Jason Tatge, Bucyrus, KS (US); Chris Schibi, Kansas City, MO (US); Daniel Mola, Paola, KS (US); Jason Munro, Lawrence, KS (US); Aeron Bowden, Shawnee, KS (US)

(73) Assignee: Farmobile LLC, Leawood, KS (US)

( * ) Notice: Subject to any disclaimer, the term of this patent is extended or adjusted under 35 U.S.C. 154(b) by 274 days.

(21) Appl. No.: 16/694,643

(22) Filed: Nov. 25, 2019

(65) Prior Publication Data
US 2020/0314113 A1 Oct. 1, 2020

Related U.S. Application Data

(63) Continuation of application No. 16/365,272, filed on Mar. 26, 2019, now Pat. No. 10,491,608.

(51) Int. Cl.
*H04L 29/06* (2006.01)
*H04L 9/06* (2006.01)
(Continued)

(52) U.S. Cl.
CPC .......... *H04L 63/126* (2013.01); *G06F 16/182* (2019.01); *G06F 16/1805* (2019.01);
(Continued)

(58) Field of Classification Search
CPC . H04L 63/126; H04L 63/0492; H04L 9/0637; H04L 2209/38; H04L 63/12;
(Continued)

(56) References Cited

U.S. PATENT DOCUMENTS 10,169,937 B1 1/2019 Zwink et al.
10,282,562 B1 5/2019 Speasl et al.
(Continued)

OTHER PUBLICATIONS

Notice of Acceptance received for Australian Patent Application No. 2020202103, dated Apr. 16, 2021, 3 pages.
(Continued)

*Primary Examiner* — Matthew Smithers
(74) *Attorney, Agent, or Firm* — Shook, Hardy & Bacon L.L.P.

(57) ABSTRACT

Embodiments provide for distributed transaction-based provenance tracking of agricultural data, secured access to authorized user accounts, auditability of the data, and transactional oversight of the data when exchanged between user accounts. A distributed ledger network including a primary node and a plurality of secondary nodes can store transactions generated based on various operations on or associated with agricultural data, including the certification of select portions of agricultural data collected by a data collection device, commands received from client devices associated with user accounts purchasing or licensing the agricultural data, and detected attempts to access the agricultural data, among other things. The primary node provides a variety of security features that can ensure that the agricultural data is protected, remains auditable by tracking the provenance of the agricultural data, and cannot be subjected to unauthorized sale, each feature having ironclad reliability based on immutable transactions stored on a distributed ledger.

20 Claims, 6 Drawing Sheets

(51) Int. Cl.
*G06F 16/182* (2019.01)
*G06F 21/60* (2013.01)
*G06F 16/18* (2019.01)

(52) U.S. Cl.
CPC ......... *G06F 21/602* (2013.01); *H04L 9/0637* (2013.01); *H04L 63/0492* (2013.01); *H04L 2209/38* (2013.01)

(58) Field of Classification Search
CPC ..... H04L 63/10; H04L 9/0897; H04L 9/3239; G06F 21/602; G06F 21/62; G06F 21/31; G06F 21/64
See application file for complete search history.

(56) References Cited

U.S. PATENT DOCUMENTS

| | | | |
|---|---|---|---|
| 10,282,711 | B2 | 5/2019 | Chan et al. |
| 10,291,395 | B1 | 5/2019 | Nenov et al. |
| 10,491,608 | B1 * | 11/2019 | Tatge .................. G06F 16/1805 |
| 2009/0093997 | A1 | 4/2009 | Fluegge et al. |
| 2010/0036696 | A1 | 2/2010 | Lang et al. |
| 2010/0110935 | A1 | 5/2010 | Tamassia et al. |
| 2014/0019423 | A1 | 1/2014 | Liensberger et al. |
| 2014/0249893 | A1 | 9/2014 | McClure et al. |
| 2016/0098723 | A1 | 4/2016 | Feeney |
| 2016/0300234 | A1 | 10/2016 | Moss-Pultz |
| 2017/0046792 | A1 | 2/2017 | Haldenby et al. |
| 2017/0287090 | A1 | 10/2017 | Hunn et al. |
| 2018/0285810 | A1 | 10/2018 | Ramachandran et al. |
| 2018/0308046 | A1 | 10/2018 | Schutt |
| 2018/0314868 | A1 | 11/2018 | Raynesford |
| 2018/0324407 | A1 | 11/2018 | Peeters et al. |
| 2019/0080392 | A1 | 3/2019 | Youb et al. |
| 2019/0081785 | A1 * | 3/2019 | Mandal ...................... H04L 9/30 |
| 2020/0042958 | A1 * | 2/2020 | Soundararajan ....... G06Q 20/06 |
| 2020/0058020 | A1 * | 2/2020 | Natarajan ............... H04L 9/006 |
| 2020/0162448 | A1 * | 5/2020 | Dasika Venkata Devi .................. H04L 63/0823 |
| 2020/0260147 | A1 * | 8/2020 | Madisetti ............. H04N 21/235 |

OTHER PUBLICATIONS

First Examination Report received for Australian Patent Application No. 2020202103, dated Sep. 15, 2020, 3 pages.
Notice of Allowance received for Canadian Patent Application No. 3,076,652, dated Oct. 5, 2020, 1 pages.
First Examination Report received for New Zealand Patent Application No. 762947, dated Oct. 15, 2020, 4 pages.
Office Action received for European Patent Application No. 20164741.9, dated May 21, 2021, 9 pages.
Second Examination Report received for NZ Patent Application No. 762947, dated Jun. 3, 2021, 7 pages.
Kim et al.; "Integrating Blockchain, Smart Contract-Tokens, and IoT to Design a Food Traceability Solution", 2018, IEEE, pp. 335-340. (Year: 2018).
Al-Jaroodi et al.; "Industrial Applications of Blockchain", 2019, IEEE, pp. 0550-0555. (Year: 2019).
Gao et al.; "A Survey of Blockchain: Techniques, Applications, and Challenges", 2018, IEEE, pp. 1-11. (Year: 2018).
Shaikh, S., et al., "AgroVita using Blockchain", 5th International Conference for Convergence in Technology (I2CT), Pune, India, pp. 1-5 (Mar. 29-31, 2019).
Xie, C., et al., "Secured Data Storage Scheme Based on Block Chain for Agricultural Products Tracking", 3rd International Conference on Big Data Computing and Communications, IEEE, pp. 45-50 (2017).
Extended European Search Report received for European Patent Application No. 20164741.9, dated Jun. 3, 2020, 10 pages.
Third Examination Report received for New Zealand Patent Application No. 762947, dated Oct. 1, 2021, 3 pages.
Summons to attend oral proceedings pursuant to Rule 115(1) EPC received for European Patent Application No. 20164741.9, dated Nov. 2, 2021, 11 pages.

* cited by examiner

DISTRIBUTED TRANSACTION-BASED SECURITY AND TRACKING OF MACHINE AND AGRONOMIC DATA

CROSS REFERENCE TO RELATED APPLICATIONS

The present application is a continuation of and claims priority from application Ser. No. 16/365,272, now U.S. Pat. No. 10,491,608, filed Mar. 26, 2019, which is assigned or under obligation of assignment to the same entity as this application, the entire contents of the application being herein incorporated by reference.

BACKGROUND

Technology continues to impact many, if not all, industries. One of many benefits of technology relates to the data generated by virtue of its use. Usage data and other types of digital information generated by way of technology can be analyzed to help industries optimize processes and mitigate inefficiencies, among other things. Agriculture is one particular industry where technological advancements can oftentimes be overlooked. Recent advancements in farming machinery and computing technology, in general, has given rise to an unforeseen use case for data. More specifically, data generated by farming machinery and other computing devices can provide valuable analytical insight into farm locations, harvest yields, farming methodologies, and more. This data, just like other types of consumer-generated data, can be easily collected, sold, and distributed by machine manufacturers without the user's consent. Generally speaking, the collection and distribution of data by farming machine or farming implement manufacturers is either required by the manufacturer or is oftentimes consented to by way of click-through agreements or other partial-to-manufacturer consent agreements.

SUMMARY

Embodiments of the present disclosure generally relate to the provenance tracking of machine or agronomic data, as well as other types of agriculture-related data, to facilitate secured access, auditability, and transactional oversight of exchanged farming data. More specifically, embodiments describe systems and techniques for utilizing various aspects of distributed ledger technologies to track the provenance of electronic agricultural datasets based on associated transactions facilitated via a data exchange marketplace or data access portal, among other things. By way of the described embodiments, access to electronic agricultural datasets, among other things, can be facilitated and immutably tracked on a distributed ledger, such as a blockchain. Moreover, in accordance with various embodiments, the disclosed techniques can maintain and employ a distributed ledger to identify authorized purchasers or licensees of the electronic agricultural datasets, determine redundancy or consistency of the electronic agricultural datasets, determine whether instances of the electronic agricultural datasets have been copied or compromised, provide restricted access to the electronic agricultural datasets based on associated marketplace transactions, or provide analytics information for the electronic agricultural datasets by way of provenance tracking, for example.

On a high level, a farming data tracking system includes a plurality of nodes that collectively maintains a distributed ledger, such as a blockchain. The nodes can, among other things, communicate with one another to verify, update, and maintain the distributed ledger, a copy of which is independently stored on and updated by each node. Any portion of the nodes can include specific components and/or have unique features that serve a purpose for generating, storing, verifying, updating, and/or analyzing transactional information associated with electronic agricultural datasets, among other things.

In some embodiments, a user (e.g., a farmer) can employ a data collection device coupled to farming machinery operable by the user. The data collection device can be associated with a user account of the user and can collect raw data generated by the farming machinery, for example. In some aspects, the data collection device can geo-tag the collected raw data based on detected location information, including but not limited to GPS data, cell tower data, Wi-Fi signal data, and the like. In some embodiments, the user can employ the data collection device and/or an associated client device to upload, to a primary node of the plurality of nodes, a set of raw data that was or is being generated by the farming machinery and collected by the data collection device. In some other embodiments, the set of collected raw data can be automatically uploaded (e.g., continuously, periodically) from the data collection device to the primary node anytime during (e.g., in real time) or after operation of the farming machinery. As such, the primary node can interpret and perform operations on the set of collected raw data, among other things.

In some embodiments, the primary node can provide an interface (e.g., a portal, a website) for the user to, among other things, upload (e.g., to the primary node), view, certify, and/or list (e.g., to an online marketplace) the set of collected, interpreted, and/or processed raw farming data, both before and after it is reviewed and/or certified via an associated client device. In various embodiments, the set of raw farming data can be grouped together and provided for display via the interface in a geospatial format, by virtue of the data being geo-tagged and/or timestamped. Among other things, the interface can facilitate user-initiated execution of operations on or associated with electronic agricultural datasets associated with a user account via the primary node and/or any other node of the plurality of nodes. In accordance with various embodiments, electronic agricultural datasets can include, by way of non-limiting example, a set of raw farming data (e.g., sensor collected data, machine or implement data), an interpreted set of raw farming data (e.g., a dataset generated based on the set of raw farming data), non-certified farming data (e.g., agronomic data associated with or determined relevant to the interpreted set of raw farming data obtained and/or received from a third-party), received certification data (e.g., crop type data, swath width data, seed variety data, nutrient data, soil data, pesticide or other chemical data) associated with the raw farming data, and/or a certified farming dataset (e.g., a dataset generated based on the interpreted raw data and the certification data), or any portion thereof, among other things.

In some embodiments, the user can provide the primary node, via the interface, certification data corresponding to a collected set of raw farming data, causing the primary node to generate a certified farming dataset based on the collected set of raw data and the certification data, among other things. For instance, the primary node can interpret (e.g., decode, translate, parse) a collected set of raw data to generate an interpreted set of raw farming data. The primary node can then receive certification data associated with the interpreted set of raw farming data (which can also be associated with the collected set of raw farming data) to generate the certified farming dataset. In some instances, non-certified farming data, which can be received or retrieved from an external resource (e.g., a third party server), can be associated with the certified farming dataset. The non-certified farming data can be associated with a certified farming dataset by the primary node based on determined common characteristics (e.g., timeframes, location) there between, among other factors.

In some embodiments, an electronic transaction formatted as a unique electronic dataset and corresponding to a certified farming dataset can be generated based at least in part on the certification data being received by the primary node. The generated transaction can include, among other things, a hash that is generated by the primary node based on an electronic agricultural dataset associated with a user account, such as the collected set of raw farming data, interpreted set of raw farming data, generated certified farming dataset, non-certified farming data associated with the certified farming dataset, certification data, and/or metadata that describes characteristics of the collected set of raw farming data or generated certified farming dataset. Once generated, the corresponding transaction can be communicated to and/or obtained by the plurality of nodes, so that the transaction is stored on the distributed ledger. As will be referenced herein, the distributed ledger can be interpreted as a distributed ledger that is collectively maintained by the plurality of nodes, a common (i.e., uniform) copy of which is stored on each node of the plurality of nodes.

In some further embodiments, the primary node can provide a data exchange marketplace (e.g., via a website) that facilitates the sale and purchase, or licensing, of any one or more electronic agricultural datasets between various user accounts. In some aspects, the data exchange marketplace can provide features for searching electronic agricultural datasets based on provided search parameters, and for facilitating the exchange of offers or offer acceptances associated with user accounts to enable the purchase or license of electronic agricultural datasets. Provided that a received offer to purchase or license an electronic agricultural dataset is accepted, a user account associated with the offer can be provided with secured access to the purchased or licensed electronic agricultural dataset.

In various embodiments, the primary node can generate a corresponding transaction formatted as a unique electronic dataset based on any of the foregoing operations associated with an electronic agricultural dataset, including but not limited to, search results including any portion of an electronic agricultural dataset, a received offer associated with the electronic agricultural dataset, a received acceptance to an offer associated with the electronic agricultural dataset, and detected attempts to access the electronic agricultural dataset. As noted above, each generated transaction associated with the electronic agricultural dataset can include, among other things, the generated hash of the electronic agricultural dataset, metadata describing the electronic agricultural dataset, and/or any portion of the received certification data. In some embodiments, each generated transaction (i.e., generated electronic dataset) is communicated by the primary node to at least one other node of the plurality of nodes, so that the plurality of nodes can obtain the generated transaction and store the generated transaction to its respective copy of the distributed ledger.

In various embodiments, and by virtue of a transaction being generated for each operation performed on or in association with a collected set of raw farming data and/or certified dataset, an immutable record for all performed operations can be stored in a distributed manner by the nodes maintaining the distributed ledger. As will be described in more detail herein, a variety of beneficial features can be facilitated by way of the techniques in which the transactions are generated for storage on the distributed ledger. For instance, in one aspect, access to an electronic agricultural dataset can be restricted such that only a user account associated with both a received offer and offer-acceptance is enabled to access the electronic agricultural dataset. In other words, the primary node can parse the distributed ledger and determine whether a particular user account is an authorized owner (e.g., generator, uploader), purchaser, or licensee of an electronic agricultural dataset. In another aspect, the distributed ledger can store a transaction generated each time an electronic agricultural dataset is accessed by a computing device associated with a user account. The transaction can include, by way of example, a timestamp corresponding to when the electronic agricultural dataset is accessed, a reference of the user account attempting to access the electronic agricultural dataset, location information (e.g., GPS coordinates, IP address) of a client device associated with the referenced user account, and more. The primary node can thus parse the distributed ledger to generate analytics information relating to the electronic agricultural dataset, such as when the electronic agricultural dataset was first acquired (e.g., purchased, licensed) by a user account, when or where the electronic agricultural dataset was accessed by the user account, or how the electronic agricultural dataset was acquired by the user account (e.g., the type of acquisition, such as a purchase or license). In some aspects, a user account originally associated with the electronic agricultural dataset (i.e., the collected raw farming data) can be provided with a collective set or subset of analytics information generated for the electronic agricultural dataset. For instance, the originally associated user account may be provided with analytics information generated for all determined licensees or purchasers of the electronic agricultural dataset.

In some further embodiments, the primary node can reference the distributed ledger to determine whether a newly certified farming dataset is a copy of a previously certified farming dataset, or generally, whether a more recently obtained or stored electronic agricultural dataset is a copy of a previously obtained or stored electronic agricultural dataset. This feature can facilitate a determination of copyright infringement, or an unauthorized attempted sale of an electronic agricultural dataset, by way of example. As described, one or more hashes can be generated based on any received or obtained electronic agricultural dataset, including raw farming data being interpreted and further certified based on received certification data. The primary node can generate a transaction including the generated hash for storage on the distributed ledger. When an electronic agricultural dataset is received, interpreted, generated, or newly certified, among other things, the primary node can reference the distributed ledger to determine whether the generated hash corresponds to the hash associated with another electronic agricultural dataset. If a determination that the two electronic agricultural datasets correspond to one another, then the primary node can perform certain functions based thereon. By way of non-limiting examples, the primary node can generate and communicate a notification to an administrator account, or to a user account associated with a first electronic agricultural dataset (e.g., a received raw farming dataset and/or certified farming dataset); certification of a second electronic agricultural dataset (e.g., a received raw farming dataset) can be rejected; or a listing of the second electronic agricultural dataset to the data exchange marketplace can be restricted, among other things.

In accordance with the various embodiments described herein, the described techniques can facilitate an ironclad means for securing, exchanging, accessing, auditing, and detecting unauthorized use of, electronic agricultural datasets, among other things.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are described in detail below with reference to the attached drawing figures, wherein.

DETAILED DESCRIPTION

Figure 1:
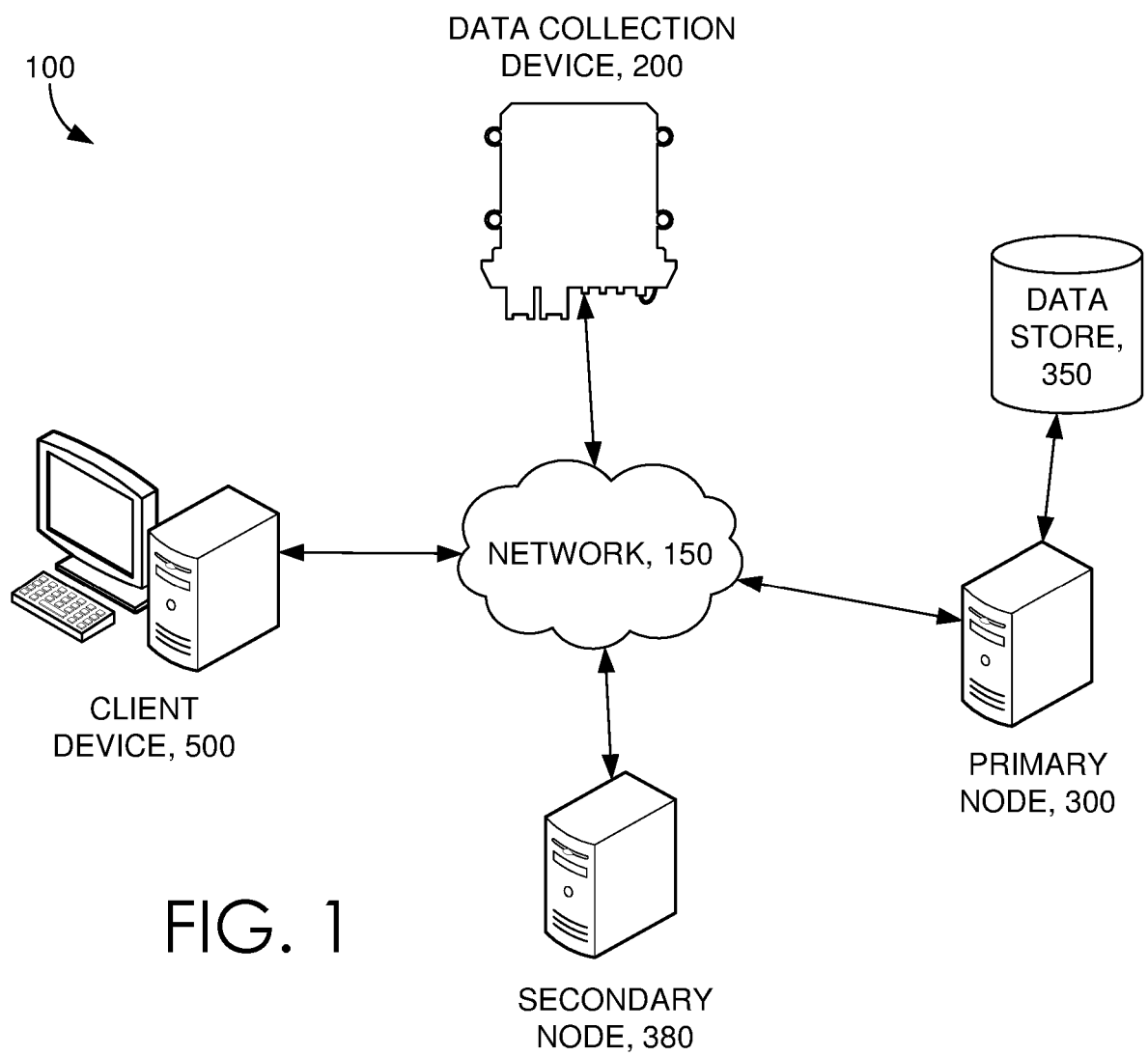
FIG. 1 is an exemplary system diagram in accordance with some embodiments of the present disclosure.

Collected consumer data, such as data collected by consumer devices, is a valuable asset that device manufacturers have learned to utilize and even commoditize through recent advances in technology. Devices such as cell phones and personal computers generate various types of data based on consumer usage, including but not limited to, how a consumer uses the device, when the consumer uses the device, where the consumer is located while carrying the device, or even who the consumer is interacting with while carrying the device. Proponents of such data collection technologies argue that this data can enable the manufacturers or third-party services to provide better, targeted services or products to the consumer. On the other hand, opponents argue that not only is the collection of data a breach of privacy, but as purchasers of devices, the data generated by virtue of the consumers' use of these devices should be owned by the consumers themselves.

The collection of data has recently expanded beyond consumer devices, however. For instance, the agriculture industry has evolved in this regard, whereby farming machinery and other computing devices can now include integrated technologies that collect various types of data, whether from the laborious efforts of farmers, detected weather patterns, satellite imagery, or any other detectable information (e.g., via sensors, scanners, Internet of Things devices) relating to environmental conditions, products being utilized, or parties involved (e.g., associated unique identifiers). This collected data has proven valuable to manufacturers beyond the analytics typically proven useful to manufacturing processes. More specifically, manufacturers have determined that third parties are now willing to purchase this data for various purposes, such as for determining optimal farming techniques, surveying farmland, and other use cases that can generally generate profit for such third parties. While the manufacturer and third parties can capitalize on user collected data, the individual (e.g., the farmer) who invests sweat equity into the generation of this data receives no perceivable benefit.

As such, one particular company, Farmobile, LLC, of Leawood, Kans., has developed a solution that enables farmers to collect and profit from this data independently. The solution is enabled via a data collection device that can be coupled to farming machinery to, among other things, collect raw farming data from the farming machinery despite manufacturers' proprietary data collection methodologies. This solution thereby facilitates the exchange of the collected raw farming data, or other electronic agricultural data associated with the collected raw farming data, directly between the farmer and interested purchasing or licensing entities. More detail relating to the data collection device and related systems and methods can be found in pending U.S. patent application Ser. No. 15/794,463, which is assigned or under obligation of assignment to the same entity as this application, the entire contents being herein incorporated by reference.

Despite the clear advantages presented in the aforementioned technology, therein lies a layer of trust that a user of the technology (e.g., a farmer) must confer to an entity responsible for retaining the collected data. Generally speaking, the ability for transacting parties to establish trust over the Internet is typically based on the availability of a trusted third-party, tasked with ensuring that each transacting party is acting in good faith. Trusted third-parties, however, typically limit their services to very specialized needs. For instance, an escrow agent can provide trusted third-party services for holding payments from buyers to sellers, releasing such payments to the sellers upon receiving notice from the buyers that the subject goods for which the payments were made are satisfactory. However, when dealing with sensitive data, third parties such as cloud storage providers must take extra measures to ensure that the data of their consumers is secure, redundant, and reliable, in order to retain consumer trust. The reliance of a third party to maintain and secure sensitive data can be difficult for some, as history has proven that despite these extra security measures, data can be hacked, corrupted, or even modified when outside of the data owner's control. The relatively recent introduction and adoption of distributed ledger technologies, such as blockchain, has provided a new and improved method to decentralize such trust services. In other words, while in conventional systems a trusted third party is typically relied upon to oversee transactions between counterparties, distributed ledger technologies can employ independent computers spread out over the world to collectively provide transactional oversight in an automated and relatively inexpensive fashion.

Provided the foregoing, embodiments described herein can facilitate the provenance tracking of obtained machine, agronomic, environmental, party, product, or commercial transaction data, among other things (any of which can be included in an electronic agricultural dataset) to provide secured access to authorized user accounts, provide auditability of electronic agricultural dataset(s), and also enable transactional oversight of the electronic agricultural dataset(s) exchanged between user accounts. In this way, users (e.g., farmers) responsible for collecting and/or associated with an electronic agricultural dataset can rely on the herein described technologies to ensure that access to their electronic agricultural datasets is secure, cannot be resold on the data exchange marketplace, and can be auditable.

Turning now to FIG. 1, a schematic depiction is provided illustrating an exemplary system 100 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 depicted in FIG. 1 includes a user client device 110 that can communicate with a public user node 120 over a network 115, such as the Internet. The system 100 also includes an entity client device 140 that can communicate with an entity node, which can include a private entity node 130A or a public entity node 130B. Each of the user client device 110, public user node 120, entity client device 140, private entity node 130A, and public entity node 130B can include a computing device, as described in more detail with respect to FIG. 7.

The system 100 preferably includes a network 150 that enables communication between at least one data collection device such as data collection device 200, at least one primary node such as primary node 300, at least one secondary node such as secondary node 380, and at least one client device such as client device 500. In various embodiments, the network 150 can include one or more networks including, but not limited to, the Internet, WANs, LANs, PANs, telecommunication networks, wireless networks, wired networks, and the like.

In some embodiments, a data collection device associated with a user account of a user (e.g., a farmer), such as data collection device 200, can be coupled to at least one raw data generating device, such as a piece of farming machinery by way of example. It is contemplated that a raw data generating device (e.g., farming machinery or implement) can include a set of sensors, computing devices, and/or electronic components that can generate raw data independent from or in conjunction with the raw data generating device. The raw data (e.g., raw farming data) can include electronic data generated by the set of sensors, computing devices, and/or electronic components coupled to any other set of sensors, computing devices, and/or electronic components, a central control unit (e.g., a computer located within a cab of the farming machinery), or any combination thereof. In some aspects, at least a portion of the sensor data can be considered raw data, as the data can be collected directly from the set of sensors, computing devices, and/or electronic components, before it is communicated to a proprietary controller or other computing device for formatting and/or interpretation, among other things.

In some further embodiments, other data collection devices associated with the user account can include a set of sensors and/or scanners, computing devices, and/or electronic components that can generate raw data based on sensed conditions or scanned information, such as environmental conditions, weather patterns, wireless signals, or RFID tags, among other things. The raw data (e.g., raw farming data) can include electronic data generated by the set of sensors and/or scanners, computing devices, and/or electronic components coupled to any other set of sensors, computing devices, and/or electronic components, or any combination thereof. In some aspects, a data collection device can be associated with a third-party, such as a weather service provider. In this regard, the data collection device can be further associated with a user account based on determined corresponding location coordinates (e.g., a user associated with a particular location can be selectively or automatically associated with one or more data collection devices in or near the particular location) or timeframes, among other things. In some aspects, non-certified farming data can include third-party collected raw data.

In various embodiments, and as will be described in accordance with FIG. 2, the one or more data collection devices, such as data collection device 200, can communicate the collected raw farming data to a primary node 300. The primary node 300 can include, among other things, at least one computing device, such as the computing device described in accordance with FIG. 7. As will be described in accordance with FIGS. 3-4, the primary node 300 can be one node of a plurality of nodes configured to collectively maintain a distributed ledger, such as a blockchain. In various embodiments, the primary node 300 can receive the collected raw farming data from the data collection device 200, and store to a memory, such as data store 350, the received raw farming data in association with the user account associated with data collection device 200.

In some embodiments, the primary node 300 can provide an interface, such as a web portal or web page, that enables a user to employ credentials (e.g., user account, password) with an associated client device, such as client device 500, to access the primary node 300. In some further embodiments, the primary node 300 can provide the interface to enable the user to access, via a client device associated with a user account of the user, profile information, associated electronic agricultural dataset(s), or generated analytics data, among other things associated with the user account. In some further embodiments, a data exchange marketplace can be provided to a client device 500 by the primary node 300, which enables the listing, searching, sale and purchase or licensing, of one or more electronic agricultural dataset(s) between user accounts. In various embodiments, the primary node 300 can generate a graphical user interface (GUI) that can be communicated and provided for display by a client device 500 to facilitate a generation of outputs by the primary node 300, and a receipt of inputs from the client device 500.

Among other things, the primary node 300 can enable a user to certify a selected set of collected raw farming data associated with a user account of the user by receiving corresponding certification data and/or other associated data (e.g., non-certified farming data). The certification data can be provided by a client device 500 also associated with the user account, while other associated data can be obtained from other computing devices, such as third-party servers, data stores, or sensor devices, among other things. In some aspects, a set of collected raw farming data can be determined (e.g., clustered or associated as a single set) by the primary node 300 based on geo-tags and/or timestamps associated with collected raw farming data received from the data collection device 200. In this way, a user can view determined sets of collected raw farming data, such that each set is separate from other sets based on time, location, and other associated metadata collected or generated by the data collection device 200. In this regard, the client device 500 or other computing device(s) can be employed to upload certification data and/or other data associated with a selected set of collected raw farming data of the user account. In various embodiments, certification data can include, by way of example, crop type data, seed variety data, swath width data, nutrient data, soil data, or other application data associated with the selected set of collected raw farming data, among other things. The primary node 300 can thereby generate, based on received certification data associated with a selected set of collected raw farming data of a user account, a certified farming dataset also associated with the user account. The generated certified farming dataset can be stored by the primary node 300 in a secure datastore included in or coupled to the primary node 300, such as datastore 350. The secure datastore 350 can include at least one storage device, database, server device, and/or encryption device, among other things.

In some embodiments, the primary node 300 can determine and/or generate one or more cryptographic hashes of a selected electronic agricultural dataset associated with a user account. In some aspects, the cryptographic hash can be generated based on a selected electronic agricultural dataset, an electronic agricultural dataset being generated (e.g., a certified farming dataset being generated), or the storage of the electronic agricultural dataset in data store 350. In various embodiments, a generated cryptographic hash, generally referenced herein as a hash, can include a set of alphanumeric characters that uniquely corresponds to a particular electronic agricultural dataset. By way of example, each certified farming dataset in a plurality of different certified farming datasets can correspond to a uniquely determined hash based on contents or formatting of the certified farming dataset. By way of further example, a hash determined or generated for a particular set of collected raw farming data or certified farming dataset will never change, so long as the particular set of collected raw farming data or certified farming dataset has not changed in any way.

In some further embodiments, the primary node 300 can generate a transaction (e.g., an electronic dataset) based on certain operations performed by the primary node 300. In various embodiments, a transaction generated by the primary node 300 can be performed for purposes of storing the generated transaction on a distributed ledger. In one example, a transaction can be generated by the primary node 300 for a particular electronic agricultural dataset. For example, the primary node 300 can generate a transaction that includes one or more generated hashes of an electronic agricultural dataset (e.g., a certified farming dataset) based on the certified farming dataset being generated and/or stored. The primary node 300 can further include any portion of received certification data or other data associated with the certified farming dataset, or determined metadata associated with the certified farming dataset. In some embodiments, the primary node 300 can determine metadata associated with a certified farming dataset based on raw farming data collected or generated by one or more data collection devices, received certification data, or by performing an analysis on the certified farming dataset to identify field identifiers, parameter types, file information, and the like. In some aspects, a user associated with the certified farming dataset can provide an input, via an associated client device 500, metadata to associate with a set of collected raw farming data and/or a certified farming dataset, among other types of electronic agricultural datasets. In another example, the primary node 300 can generate a transaction (e.g., an electronic dataset) for offers (e.g., electronic bids) received, via the provided data exchange marketplace, from a client device 500 associated with a first (e.g., offeror) user account, to purchase or obtain a license to a particular electronic agricultural dataset. Similarly, the primary node 300 can generate a transaction (e.g., an electronic dataset) for offer rejections (e.g., electronic offer rejection) or offer acceptances (e.g., electronic offer acceptances) received, via the provided data exchange marketplace, from second (e.g., offeree, seller, licensor) user account, to sell or license out a particular electronic agricultural dataset (e.g., certified or non-certified farming data or datasets) to the first user account associated with a received offer. In various embodiments, each generated transaction can include the generated hash of either or both a particular electronic agricultural dataset associated with a received offer, rejection, or acceptance, an amount (e.g., payment amount) included in the received offer, rejected offer, or accepted offer, a timestamp or location corresponding to the received offer, rejected offer, or accepted offer, among other things. Similarly, the transaction can further include any portion of received certification data, non-certified data, or other data associated with the certified farming dataset, and/or determined metadata associated with the certified farming dataset.

In some embodiments, the primary node 300 can analyze generated transactions stored on the distributed ledger (e.g., a respective copy thereof) to perform a variety of functions relating to the system described herein, such as restricting or enabling stored electronic agricultural dataset access to one or more user accounts, generating analytics information for one or more user accounts, one or more electronic agricultural datasets, or any combination thereof, and/or generating notifications based on determining that an electronic agricultural dataset was sold or listed for sale on the data exchange marketplace without permission or unlawfully, among other things.

In various embodiments, the primary node 300 can employ the generated hash of an electronic agricultural dataset, associated metadata, and/or any portion of the certification data, non-certified farming data, or other associated data, to search and parse transactions stored on the distributed ledger. In this way, the primary node 300 can identify transactions associated with a received offer and a corresponding received acceptance to the received offer, transactions associated with a particular user account, transactions associated with a particular electronic agricultural dataset, or any combination thereof, to facilitate the variety of functions described above.

Figure 2:
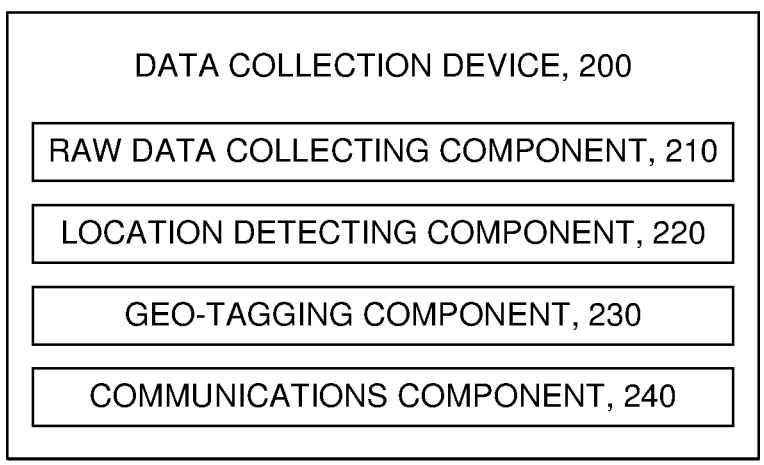
FIG. 2 is a block diagram depicting an exemplary data collection device in accordance with some embodiments of the present disclosure.

Referring now to FIG. 2, a block diagram is provided depicting an exemplary data collection device 200 in accordance with some embodiments of the present disclosure. The data collection device 200 can be associated with a unique identifier, such as a hardware ID, serial number, electronic identifier, among other things. In some embodiments, the unique identifier can be encoded into hardware and/or software of the data collection device 200. In some further embodiments, the unique identifier can be associated with a user account, such that a logical or symbolic mapping there between is maintained in a memory of a node, such as primary node 300 of FIG. 1.

Figure 7:
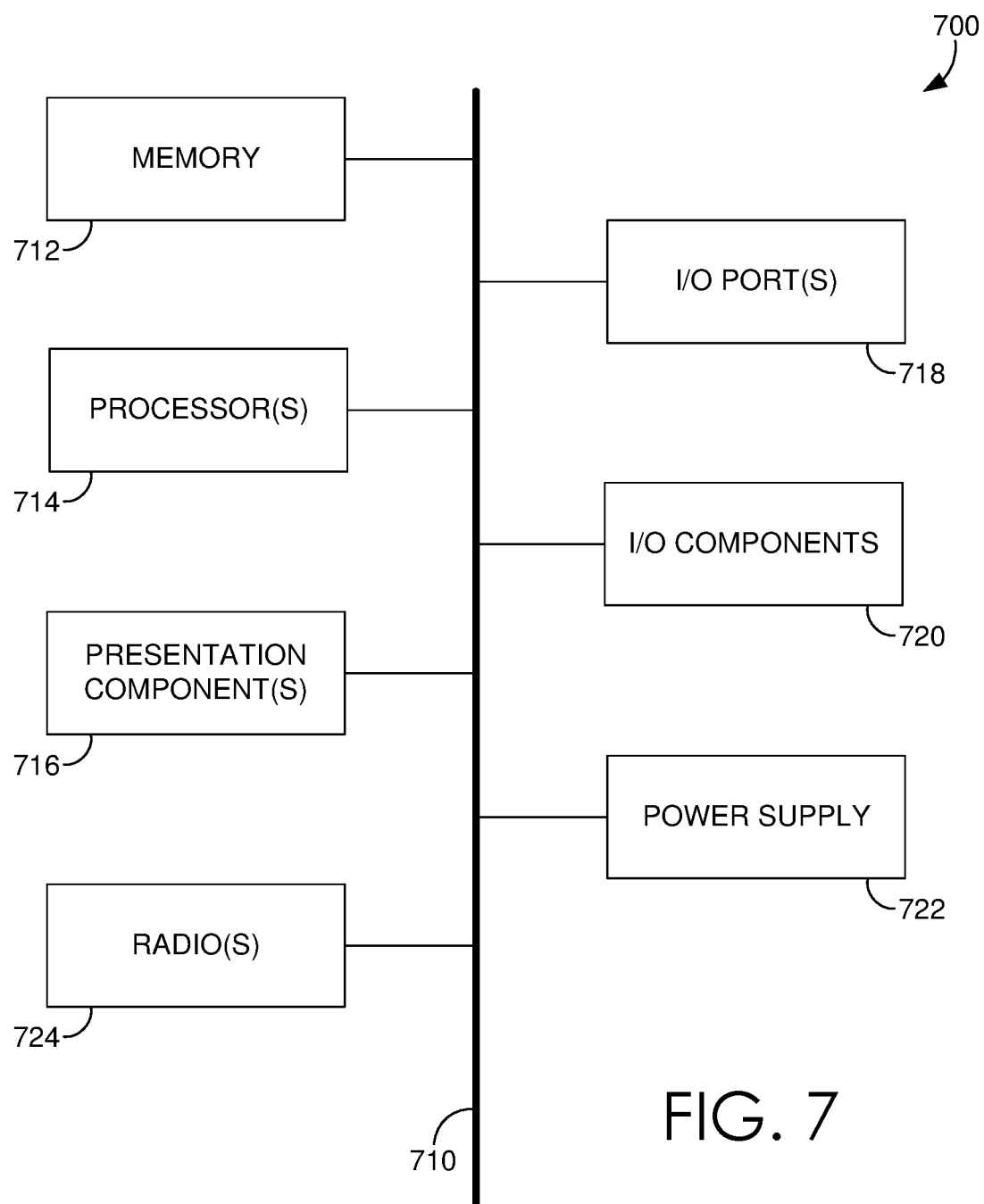
FIG. 7 is a block diagram of an exemplary computing environment suitable for use in implementing some embodiments of the present disclosure.

In accordance with various embodiments, data collection device 200 can include at least one computing device described in accordance with FIG. 7 and can be coupled to one or more data lines further coupled to sensors, computing devices, electric lines, modules, or other raw data sensing, raw data collecting, and/or raw data generating electronics (herein collectively referred to as "sensors") associated with a piece of farming machinery and/or components coupled thereto. In some embodiments, the data collection device 200 can include at least one input port for receiving and storing the raw data in a memory (e.g., a data storage device), and at least one output port for passing through the received raw data to a computing device associated with the piece of farming machinery. The data collection device 200 can further include, among other things, a raw data collecting component 210, a location detecting component 220, a geo-tagging component 230, and a communications component 240.

In some embodiments, the raw data collecting component 210 can receive raw data (e.g., raw farming data) communicated from the sensors to an input port of the data collection device 200. The raw data collecting component 210 can store the received raw data into a cache or a memory. The data collection device 200 can further include a location detecting component 220 that can detect a physical location of the data collection device 200. In some embodiments, the location detecting component 220 can include a GPS module for determining GPS coordinates, a Wi-Fi antenna for detecting nearby Wi-Fi signals, a cellular radio for detecting nearby telecommunication towers, a Bluetooth radio for detecting nearby Bluetooth radios, or any other location detecting technology for determining a precise or approximate location of the data collection device 200.

In some embodiments, the data collection device 200 can employ the location detecting component 220 to determine a location of the data collection device 200 in accordance with receiving raw data via the raw data collecting component 210. In other words, at substantially the same time (e.g., under 1 second) of receiving a piece of raw data via raw data collecting component 210, the data collection device 200 can determine the location of data collection device 200 at substantially the same time the piece of raw data is received. In some embodiments, each piece of raw data and each piece of determined location information can be independently timestamped, such that the data collection device 200 can associate a piece of received raw data to a piece of determined location information. In this regard, the data collection device 200 can employ a geo-tagging component 230 to "tag" (e.g., map, embed into, modify) each piece of received raw data with a piece of determined location information. In other words, each piece of received raw data can be tagged with a location of the data collection device 200 determined at a time the piece of raw data was collected by the data collection device 200. In this regard, the received raw data being geo-tagged by geo-tagging component 230 and stored in a cache or memory of the data collection device 200 can be referenced herein as collected raw farming data.

Figure 3:
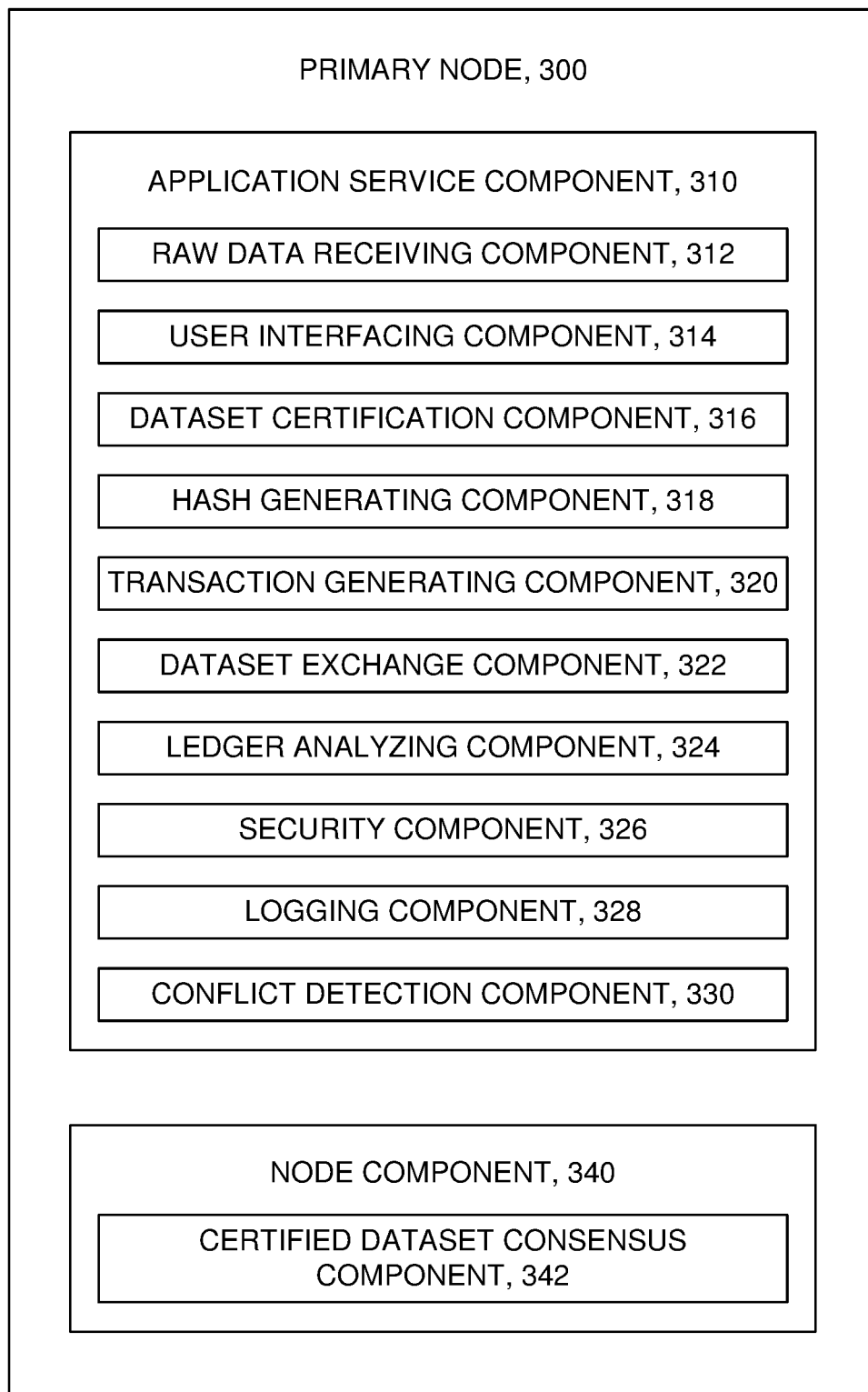
FIG. 3 is a block diagram depicting an exemplary primary node in accordance with some embodiments of the present disclosure.

In some further embodiments, the data collection device 200 can include a communications component 240, which facilitates the wired and/or wireless communication of the collected raw farming data to a primary node, such as primary node 300 of FIGS. 1 and 3. In some embodiments, the data collection device 200 can communicate the collected raw farming data to the primary node in real time, such that the collected raw farming data is continuously streamed or periodically communicated to the primary node. In some other embodiments, the data collection device 200 can communicate the collected raw farming data to the primary node when a communications signal (e.g., Wi-Fi signal, Bluetooth signal, cellular signal) is available to the communications component 240. In this regard, the received raw data can continue to be geo-tagged and stored in a memory or cache of the data collection device 200, such that when the communications signal is available, the communications component 240 can establish a signal with the primary node and communicate the collected raw farming data to the primary node.

In some embodiments, the communications component 240 can communicate the unique identifier associated with the data collection device 200 prior to or in conjunction with any portion of collected raw farming data communicated to the primary node. In some other embodiments, the geo-tagging component 230 can include metadata including the associated unique identifier when "tagging" the received raw data. In this way, the primary node can determine that the collected raw farming data being received is associated with the data collection device 200 and can further determine that the collected raw farming data being received is associated with a user account associated with the data collection device 200.

Looking now to FIG. 3, a block diagram is provided depicting an exemplary primary node 300 in accordance with some embodiments of the present disclosure. The primary node 300 can include at least one computing device described in accordance with FIG. 7 and can further include an application service component 310 for providing various features employing distributed ledger technologies further facilitated by node component 340, as will be described herein.

In some embodiments, the application service component 310 can include various components that, among other things, facilitates a generation of certified farming datasets, an exchange of electronic agricultural datasets between user accounts, a generation of immutable transactions that reflect any or all detected interactions relating to an electronic agricultural dataset, a storage of the generated transactions to a distributed ledger, such as a blockchain, and an analysis of the stored transactions to facilitate authorized access to an electronic agricultural dataset, generate analytics relating to an electronic agricultural dataset, or generate notifications based on determined unauthorized exchange of an electronic agricultural dataset relating to the system described herein.

The application service component 310 can include a raw data receiving component 312 that can receive, via a network such as network 150 of FIG. 1, collected raw farming data from one or more data collection devices, such as data collection device 200 of FIGS. 1 and 2. The raw data receiving component 312 can determine that the collected raw farming data being received is associated with one of a plurality of user accounts stored or registered on the primary node 300. In some embodiments, the determination can be made based on an identified mapping between one of the plurality of user accounts and a data collection device unique identifier being included in or associated with the collected raw farming data being received. In some embodiments, the determination can be made based the unique identifier or associated user account being referenced in a handshake between the primary node 300 and the data collection device, or the same being included in the collected raw farming data being received.

In some embodiments, the raw data receiving component 312 can parse the collected raw farming data received from the data collection device based on the tags associated with the collected raw farming data.

In some aspects, a set of collected raw farming data can be encoded (e.g., via a machine or implement from which the data was collected), such that the raw data receiving component 312 can decode, interpret, or convert the set of collected raw farming data to generate an interpreted set of raw farming data. In this regard, the interpreted set of raw farming data can be referenced herein as raw farming data, in accordance with some embodiments, and operations performed on a set of raw farming data can similarly or alternatively be performed on the interpreted set of raw farming data. By virtue of the collected raw farming data being geo-tagged, the raw data receiving component 312 can select a portion of the raw farming data received from the data collection device, to generate a set of raw farming data that corresponds to a common task (e.g., a work task) performed with the farming machinery. In some aspects, the raw data receiving component 312 can factor in location information and/or timestamps associated with the raw farming data received from the data collection device and/or interpreted by raw data receiving component 312, such that both location and time are considered to identify related pieces of collected raw farming data. In some aspects, the related pieces of raw farming data can be identified automatically (e.g., based on timestamps and/or location being determined substantially continuous), or manually (e.g., based on provided inputs, such as timestamp and/or location data received via a client device or sensor). In this way, one or more sets of raw farming data associated with a user account can be determined, each being related to a particular area or geographic locus, time period, task performed by a user (e.g., farmer) associated with the user account and with the farming machinery coupled to the data collection device, among other things.

In some embodiments, the application service component 310 can include a user interfacing component 314 to generate a graphical user interface or GUI elements, that are communicated to and provided for display by a client device associated with a user account, such as client device 500 of FIG. 1. In some further embodiments, the GUI can include a webpage and the GUI elements can include text or graphical elements thereof. In some other embodiments, the client device can include a computer application adapted to interface with the application service component 310. In this regard, the application service component 310 can generate output data that is communicated to and provided for display by the client device via the computer application.

In some aspects, the user interfacing component 314 can receive inputs, obtained via the GUI and communicated from the client device. The user interfacing component 314 can also generate outputs to be communicated to and provided for display by the client device via the displayed GUI. In accordance with various embodiments described herein, the user interfacing component 314 can be employed by any component of the primary node 300 to generate and provide outputs to a client device, or receive inputs communicated from the client device. To this end, a determined set of raw farming data associated with a user account can be provided for display to a client device that is associated with the user account in a graphical format.

In some instances, a set of raw farming data determined by raw data receiving component 312 can be overlaid on a map or graphical depiction of a geographic region that is determined to correspond to the location information included in the determined set of raw farming data. In some aspects, a timeframe corresponding to a time period in which the determined set of raw farming data was received from the data collection device, can be provided for display via the GUI.

In some embodiments, the application service component 310 can include a dataset certification component 316. The dataset certification component 316 can be employed by the application service component 310 to generate, among other things, a certified farming dataset associated with a user account based on a selected set of raw farming data associated with the user account, and certification data and/or other associated data (e.g., non-certified data, metadata) received from a client device associated with the user account. By way of a non-limiting example, the user interfacing component 314 can present, via a GUI, one or more determined sets of raw farming data associated with a user account. The user interfacing component 314 can receive a selection corresponding to a particular determined set of raw farming data, thereby generating a GUI prompt to receive certification data and/or other data associated with the selected set of collected raw farming data. A user associated with the user account can employ an associated client device to upload the corresponding certification data and/or other associated data to the primary node 300, such that the dataset certification component 316 can generate a certified farming dataset associated with the user account based on the selected set of raw farming data and the received certification data and/or other associated data. In some further embodiments, the dataset certification component 316 can store the generated certified farming dataset into a memory or a secure datastore, such as datastore 350 of FIG. 1. Once a certified farming dataset is generated in association with a user account, the dataset certification component 316 can flag the certified farming dataset as being eligible for listing on a data exchange marketplace, as will be described in accordance with dataset exchange component 322. In some further embodiments, it is contemplated that any type of electronic agricultural dataset associated with the user account and described herein can be selected and flagged as being eligible for listing, in addition to any other of the described operations that can be performed on, for example, a certified farming dataset.

In some embodiments, the application service component 310 can include a hash generating component 318 that determines and generates a hash for any electronic agricultural dataset, among other things. The hash generating component 318 can employ a cryptographic hashing algorithm, such as SHA 256, that can receive a piece of data (e.g., electronic agricultural dataset) as input, and generate an output (e.g., a hash) that represents a digital fingerprint of the input. In various embodiments, any type of cryptographic hashing algorithm may be employed, so long as the algorithm generates deterministic outputs (e.g., the same input always generates the same output), is non-resource intensive, generates irreversible outputs (e.g., the input cannot be regenerated based on the output), generates uncorrelated hashes (e.g., small changes in the input generates significantly different outputs), and generates unique hashes for each input (e.g., infeasible to generate a common output based on different inputs). In various embodiments, the application service component 310 can employ the hash generating component 318 to generate a hash for an electronic agricultural dataset in response to among other things, receiving, obtaining, certifying, generating, and/or storing of the electronic agricultural dataset.

In some embodiments, the application service component 310 can include a transaction generating component 320 that generates a transaction (e.g., an electronic dataset), which can be stored on a distributed ledger maintained by a plurality of nodes. In this way, the distributed ledger can record each transaction associated with an electronic agricultural dataset in an immutable fashion. The transaction generating component 320 can include data within a generated transaction based on one or more operations performed on or in association with an electronic agricultural dataset associated with a user account, among other things. In some aspects, transaction generating component 320 can digitally sign (e.g., with a digital signature) a generated transaction with a private key. In some instances, the private key can be associated with an entity associated with the datastore, such as datastore 350 of FIG. 1, in which any one or more electronic agricultural datasets are stored. In some other instances, the private key can be associated with a user account associated with an operation being performed on or in association with an electronic agricultural dataset. In other words, an operation performed on or in association with an electronic agricultural dataset, initiated by a client device associated with a user account, can cause the transaction generating component 320 to generate a transaction that is digitally signed with a private key associated with the user account. It is contemplated that one or more private keys are securely stored by the primary node 300, though the private key(s) can also be stored in the datastore or can be provided by a client device associated with a user account and private key.

In some further embodiments, a transaction generated by transaction generating component 320 based on an operation performed on or in association with an electronic agricultural dataset can include, among other things, a generated hash of the electronic agricultural dataset (e.g., the hash generated by hash generating component 318), one or more portions of the electronic agricultural dataset, and/or metadata associated with the electronic agricultural dataset. In one non-limiting example, transaction generating component 320 can generate a transaction (e.g., an electronic dataset) based on a certified farming dataset being generated. In this regard, the generated transaction can be digitally signed with a private key, such as a private key associated with a user account of the certified farming dataset (e.g., the user account associated with the data collection device from which the collected raw farming data utilized to generate the certified farming dataset was received).

In another aspect, the transaction generating component 320 can generate a transaction (e.g., an electronic dataset) based on an operation being performed in association with electronic agricultural dataset. For instance, a listing of an electronic agricultural dataset (e.g., via dataset exchange component 322) can cause a transaction to be generated by transaction generating component 320. In another instance, a received offer or accepted offer associated with a listed electronic agricultural dataset (e.g., via dataset exchange component 322) can cause a transaction to be generated by transaction generating component 320. In another instance, each time an electronic agricultural dataset is determined accessed by a user account can cause a transaction to be generated by transaction generating component 320. In various instances, each of the foregoing transactions can either be digitally signed by a private key of a user account responsible for causing the operation (e.g., listing, offer, acceptance, access) to be performed, or can further include a reference to the responsible user account. In some aspects, the nature of the operation can also be referenced in a generated transaction, such that the generated transaction can describe why the transaction was generated (e.g., based on operations performed on the electronic agricultural dataset, the listing of the electronic agricultural dataset, an offer being received, an accepted offer being received for the offer, the electronic agricultural dataset being accessed). In various embodiments, the generation of a transaction by transaction generating component 320 can cause the generated transaction to be automatically communicated to one or more nodes of a plurality of nodes configured to maintain a distributed ledger. As will be described, the nodes can obtain the communicated transaction and store it to the distributed ledger.

In some embodiments, the application service component 310 can include a dataset exchange component 322 that can employ aspects of the user interfacing component 314 to facilitate the listing, purchase, sale, and/or licensing of electronic agricultural datasets between user accounts. In one aspect, the dataset exchange component 322 can provide for display and facilitate, among other things, a data exchange marketplace, where an electronic agricultural dataset associated with a user account can be listed for sale or licensing on the data exchange marketplace based on a received input from a client device associated with the user account.

In another aspect, the dataset exchange component 322 can include a search engine that can receive one or more search parameters from a client device associated with a user account. Based on the received search parameter(s), the dataset exchange component 322 can generate a search query for searching electronic agricultural datasets listed via dataset exchange component 322. In this regard, the dataset exchange component 322 can identify a set of stored electronic agricultural datasets flagged for listing and also corresponding to the search query. The dataset exchange component 322 can further generate a search result including the identified electronic agricultural dataset. The dataset exchange component 322 can communicate the generated search result to the client device from which the one or more search parameters were received, such that they are provided for display by the client device.

In another aspect, the dataset exchange component 322 can receive a command associated with a selected one of one or more electronic agricultural datasets provided for display by a client device associated with a user account. The command can include a request to generate an offer for the selected electronic agricultural dataset, generate an answer to decline the offer for the selected electronic agricultural dataset, or generate an answer to accept the offer for the selected electronic agricultural dataset. It is contemplated that received requests to generate offers are received from client devices associated with user accounts interested in purchasing or licensing a selected electronic agricultural dataset, while received requests to decline or accept offers are received from client devices associated with user accounts associated with electronic agricultural datasets for which requests to generate offers are received.

In some embodiments, the dataset exchange component 322 can generate a notification that is communicated to a client device associated with a user account of the electronic agricultural dataset for which an offer was received. On the other hand, in some embodiments, the dataset exchange component 322 can generate a notification that is communicated to a client device associated with a user account of the received offer for which a rejection or acceptance was received. In some further embodiments, for any electronic agricultural dataset to which an offer is received, and an acceptance of the offer is also received, the dataset exchange component 322 can further associate the electronic agricultural dataset with the user account associated with the received offer. In other words, a user account that purchases or licenses an electronic agricultural dataset via dataset exchange component 322 can be provided access to the electronic agricultural dataset. As will be described, access to an electronic agricultural dataset can be determined based on transactions generated and stored on a distributed ledger in view of the commands received via dataset exchange component 322.

In some embodiments, the dataset exchange component 322 can generate a uniform resource identifier or "URI" (e.g., a URL, a link, a pointer, a path) that corresponds to a location from which an electronic agricultural dataset can be accessed. In some aspects, a unique URI can be generated for each user account that is provided access to an electronic agricultural dataset, such as a user account associated with an offer that was accepted. In this regard, each user account having access to an electronic agricultural dataset can access the electronic agricultural dataset via its respective generated URI. In some aspects, an interface presented by virtue of accessing the URI can still include a prompt to receive credentials (e.g., user account, password) associated with the URI to facilitate access to the electronic agricultural dataset. As will be described, detected characteristics of a client device accessing the URI, including successful or failed login attempts thereto, can be obtained and logged in a distributed ledger by a logging component 328.

In some embodiments, the application service component 310 can include a ledger analyzing component 324 that searches, parses, and analyzes transactions (e.g., electronic datasets) stored on a distributed ledger and determined to correspond to one or more provided parameters (e.g., a hash, a portion of certification data and/or other associated data, metadata, a user account, a location, a time period, nature or type of corresponding operation). In some aspects, the ledger analyzing component 324 can generate a graphical depiction of transactions determined to correspond to the provided parameter(s). The graphical depiction can be provided in the form of a timeline, a tree, a list, a table, or a graph, among other things. The application service component 310 can employ the user interfacing component 314 to provide for display the generated graphical depiction to one or more client devices associated with the analyzed transactions. In other words, a user account associated with an electronic agricultural dataset can access generated analytics information corresponding to the electronic agricultural dataset. Among other things, the generated analytics information can provide details relating to all operations performed on or associated with an electronic agricultural dataset accessible to a user account. In this way, a user can employ an associated client device to view a provenance timeline of all operations associated with his or her electronic agricultural dataset. It is contemplated that in some circumstances, any one or more user accounts and/or associated client devices can be associated with an electronic agricultural dataset, not necessarily limited to whether the user account and/or associated client device was associated with a marketplace transaction or the data collection device from which a set of raw farming data was received. For instance, a third party or other entity associated with a user account that uploads raw farming data on another user's behalf can be provided access to the electronic agricultural dataset. It is thus contemplated that the other user or an administrator can define permissions for the third party or entity in this regard. As such, one or more user accounts can be associated with an electronic agricultural dataset.

In some embodiments, the application service component 310 can include a security component 326 that determines whether a user account can have authorized access an electronic agricultural dataset. In some aspects, the security component 326 can employ ledger analyzing component 324 to search and identify all stored transactions that either include a reference to the user account and/or is digitally signed with a private key associated with the user account. The ledger analyzing component 324 can parse all transactions based on the foregoing parameters, each being directly associated with a user account (e.g., the transacted was generated based on one or more inputs from a client device associated with the user account) or indirectly associated with the user account (e.g., the transacted not being generated in association with the user account, but including a reference to the user account).

The security component 326 can thus identify transactions generated based on operations (e.g., receipt, certification, generation, storage) performed on an electronic agricultural dataset, a received command to generate an offer for an electronic agricultural dataset, a received command to accept an offer for an associated electronic agricultural dataset, a received command to reject an offer for an associated electronic agricultural dataset, or a received request to access an electronic agricultural dataset, among other things.

In various embodiments, the security component 326 can receive, from a client device associated with a user account, a request to access an electronic agricultural dataset. The security component 326 can identify from a stored table of generated hashes mapped to one or more electronic agricultural datasets, or can generate, the hash of the electronic agricultural dataset. The security component 326 can identify all stored transactions and parse those transactions including the hash(es).

In one embodiment, the security component 326 can determine that a particular transaction of the parsed transactions is an earliest stored transaction associated with an electronic agricultural dataset. That is, of all parsed transactions, one particular transaction is identified as being first in time, or having an earliest timestamp included therein. The security component 326 can determine that the particular transaction is also directly associated with the user account. In other words, the particular transaction was digitally signed with a private key of the user account, or includes an indication that the certified farming dataset was generated based on certification data received by the user account. In this way, the security component 326 can determine that the user account can access the electronic agricultural dataset, because the user account is determined the original owner of the electronic agricultural dataset. The security component 326 can thus enable access of the electronic agricultural dataset to the user account.

In another embodiment, the security component 326 can determine that the first in time transaction is not directly associated with a particular user account, or in other words, the particular user account is not the original owner of the electronic agricultural dataset. As such, the security component 326 can identify, from the parsed transactions, a subset of transactions that is directly or indirectly associated with the user account. That is, the security component 326 can identify transactions that were generated based on received offers, associated with the user account, to purchase or license the electronic agricultural dataset. The security component 326 can also identify transactions that were generated based on received rejections or acceptances (i.e., to the received offer) by determining that one or more of the subset of transactions include references to the received offer or references to the generated transaction corresponding to the received offer. If the security component 326 determines that an indirectly associated transaction was generated based on a received acceptance to an offer received from the user account, or in other words an offer to purchase or license the electronic agricultural dataset from the user account was accepted by another user account that owns the electronic agricultural dataset, then the security component 326 can determine that the user account can access the electronic agricultural dataset and thus enable access of the electronic agricultural dataset to the user account.

In some embodiments, the application service component 310 can include a logging component 328 that can employ at least one of the security component 326, user interfacing component 314, and transaction generating component 320, to generate a transaction based on each detected attempt to access a stored electronic agricultural dataset. In various embodiments, an attempt to access a stored electronic agricultural dataset can be detected based on a URI corresponding to the stored electronic agricultural dataset, such as a URI generated by dataset exchange component 322, being accessed by a client device, such as client device 500 of FIG. 1. As briefly noted above, characteristics of a client device accessing the URI can be detected by logging component 328. For instance, the logging component 328 can employ transaction generating component 320 to generate a transaction for each successful or failed login attempt. Each generated transaction can include, among other things, an indication of whether the access attempt was successful or unsuccessful, a URI associated with the attempt, an IP address or other client device characteristics associated with the attempt, credentials received during the attempt, and a duration or other characteristics associated with the session established for the attempt. In some embodiments, the transactions generated by logging component 328 can be stored on the distributed ledger in accordance with node component 340, as will be described.

In some embodiments, the application service component 310 can include a conflict detection component 330 that determines whether a particular electronic agricultural dataset is being utilized in an unauthorized manner. For instance, the conflict detection component 330 can employ hash generating component 318 to generate a hash of a particular electronic agricultural dataset, such as one that may be listed to a data exchange marketplace, or even available on a third-party website or marketplace, and compare the generated hash to the hashes generated for the electronic agricultural dataset stored by the primary node 300, such as the sets of raw farming data, non-certified farming data, and/or certified farming datasets stored on datastore 350 of FIG. 1, by way of example.

In one aspect, conflict detection component 330 can determine that a first electronic agricultural dataset that is newly received and/or generated (e.g., based on received certification data and/or other associated data) is identical to a previously-received and/or generated second electronic agricultural dataset. As such, conflict detection component 330 can cancel generation of, or delete, the first electronic agricultural dataset. The conflict detection component 330 can further generate a notification that is provided to one or more user accounts associated with the second electronic agricultural dataset, such as the original owner's user account and/or purchaser or licensee user accounts, indicating that an attempt to generate a copy of the electronic agricultural dataset was detected.

In another aspect, conflict detection component 330 can determine that a first electronic agricultural dataset listed on a data exchange marketplace, such as one facilitated by data exchange component 322, is identical to a second electronic agricultural dataset already listed on the data exchange marketplace. In this regard, conflict detection component 330 can detect the identical electronic agricultural datasets and generate a notification that is provided to any one of the original owner's user account, purchaser or licensee user accounts, the user account associated with the first or second electronic agricultural datasets, or an administrator account. In some instances, conflict detection component 330 can employ ledger analyzing component 324 to determine whether a first user account associated with the first electronic agricultural dataset or a second user account associated with the second electronic agricultural dataset is an original owner of the corresponding first and second electronic agricultural datasets. In this regard, a digital signature of, or reference to, the first or second user account included an earliest-in-time transaction also including a hash of the corresponding first and second electronic agricultural datasets can be identified to determine which user account is authorized to list the electronic agricultural dataset. In other words, the user account associated with the earliest-in-time transaction including the hash of both the first and second electronic agricultural datasets can be determined as an authorized listing account, such that the conflict detection component 330 removes the listing associated with the other determined unauthorized listing account.

In some aspects, conflict detection component 330 can receive, via user interfacing component 314, an electronic agricultural dataset or a URI to a remotely-stored electronic agricultural dataset as an input. In this regard, the input is provided by a client device, so that conflict detection component 330 can determine whether the electronic agricultural dataset, received via the input or retrieved via the input URI, is an unauthorized copy of another electronic agricultural dataset stored by the primary node 300. As such, conflict detection component 330 can employ hash generating component 318 to generate a hash of the received or retrieved electronic agricultural dataset, compare the generated hash to the hashes of the stored electronic agricultural datasets, and determine whether there is a match there between. In the event a match is determined, conflict detection component 330 can generate a notification indicating the same. To this end, a user can employ an associated client device to access the conflict detection component 330, via user interfacing component 314, and determine whether a particular electronic agricultural dataset is an unauthorized copy of their own electronic agricultural dataset. Moreover, the user can reference the distributed ledger to provide various types of immutable proof (e.g., time, location) that the electronic agricultural dataset was originally uploaded and/or generated by the user.

In various embodiments, the primary node 300 can further include a node component 340 that can communicate with node components of other nodes, such as secondary node 380 of FIG. 1, to enable the collective maintenance of a distributed ledger with the other nodes. The node component 340 can, among other things, identify and establish connections with other nodes of a plurality of nodes, which includes the primary node 300 and a plurality of secondary nodes, such as secondary node 380 of FIG. 1. The node component 340 can include, among other things, a dataset consensus component 342, which is described now with reference to FIG. 4.

Figure 4:
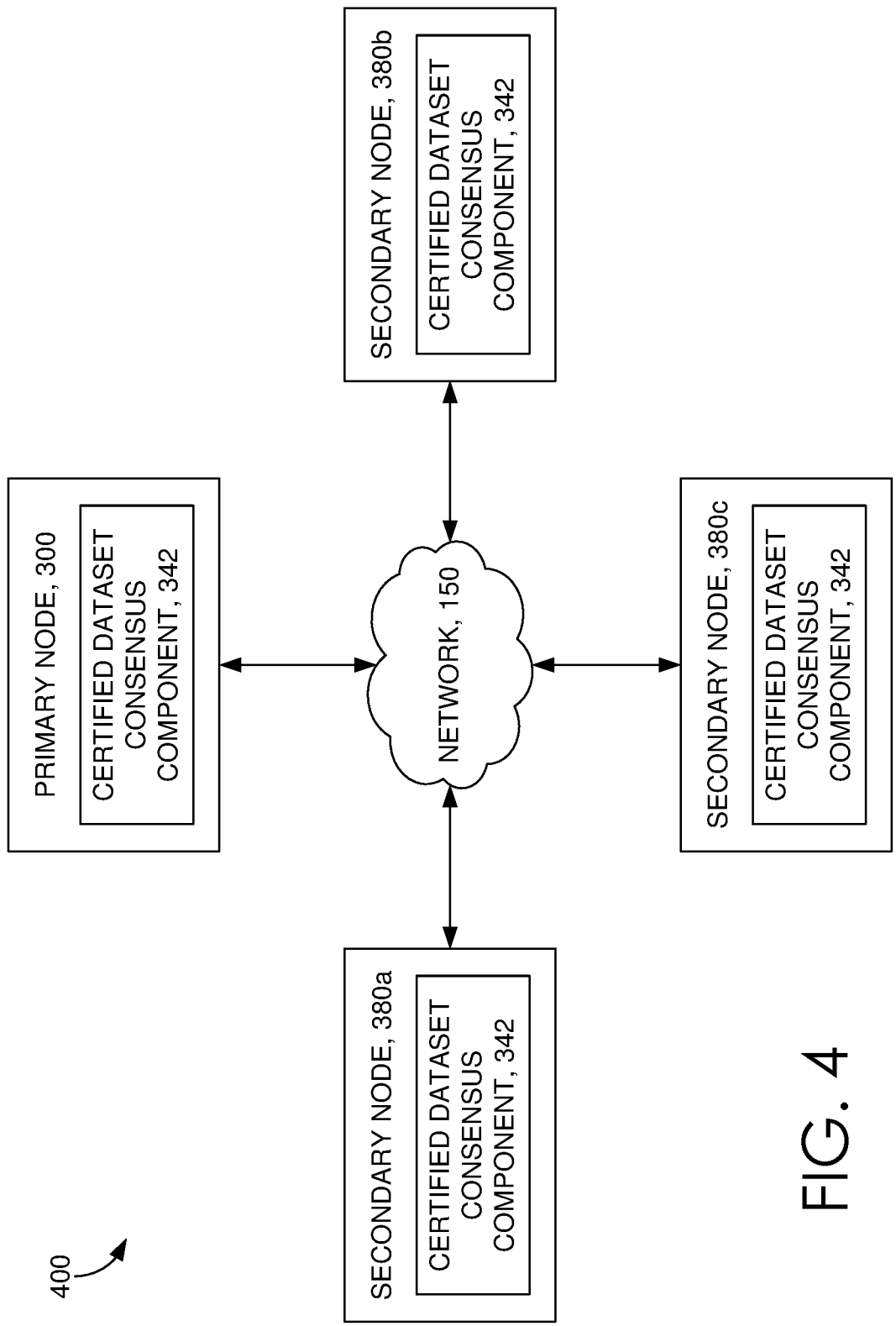
FIG. 4 is a system diagram depicting an exemplary plurality of nodes collectively maintaining a distributed ledger in accordance with some embodiments of the present disclosure.

Looking at FIG. 4, a schematic depiction is provided illustrating an exemplary distributed ledger network 400 comprising at least one primary node 300 and a plurality of secondary nodes 380a, 380b, 380c, in which some embodiments of the present disclosure may be employed. The distributed ledger network 400 depicted in FIG. 4 includes a plurality of nodes 300, 380a-c that can include a computing device described in accordance with FIG. 7, and are each in communication with one or more of the plurality of nodes via a network 150, as is described in accordance with FIG. 1. In some embodiments, and preferably for public blockchain implementations, each node 300, 380a-c in the distributed ledger network 400 can generally operate as a peer to every other node for purposes of maintaining a distributed ledger, such as a blockchain, such that no single node is more influential or powerful than any other node 300, 380a-c for purposes of maintaining the distributed ledger. Operations performed by nodes can include, among other things, sending and receiving transactions (e.g., electronic datasets), validating transactions, verifying blocks of transactions, and adding transactions to an immutable ledger that is collectively maintained by the nodes 300, 380a-c, a copy of which is respectively stored in a memory of each node.

It is contemplated, however, that in some embodiments, a particular subset of the nodes, such as primary node 300, can be specifically designated for performing more operations than those that will be described in accordance with dataset consensus component 342. In this regard, as opposed to embodiments where each node is an absolute peer with other nodes, some embodiments can employ specially-"privileged nodes" or "unprivileged nodes" (preferably for private blockchains or ecosystems where centralization is not a concern) that perform more operations than those generally described in accordance with FIG. 4, such as those described in accordance with application service component 310 of FIG. 3.

In some embodiments, the immutable ledger collectively maintained by the nodes 300, 380a-c is referenced herein as a blockchain. The blockchain maintained by the distributed ledger network 400 stores thereon a plurality of transactions (e.g., electronic datasets), such as the electronic transactions generated by transaction generating component 320 of FIG. 3, which are immutable by virtue of the distributed nature of the distributed ledger network 400, applied cryptography concepts, and the dataset consensus component 342 that is independently included in each of nodes 300, 380a-c. In a traditional distributed ledger network, any node can generate a transaction to be added to the blockchain. In accordance with some embodiments described herein, a primary node 300 generates the transactions to be added to the blockchain. As such, each node can include a dataset consensus component 342 that enforces a processor enforced rule, whereby a transaction can only be added to the blockchain based on a determination that a consensus (e.g., a majority, a super majority, unanimity) of the nodes 300, 380a-c has collectively validated the transaction. In this regard, while each node 300, 380a-c can independently store a copy of the blockchain, a transaction can only be added to the blockchain when a consensus to add the transaction has been determined reached by the nodes 300, 380a-c of the distributed ledger network 400.

In some embodiments, validation of a transaction is facilitated utilizing features of asymmetric key cryptography (i.e., public-private key pairs), among other things. In some aspects, as is commonly known in public blockchains (e.g., Bitcoin, Ethereum), a private key can be employed to generate one or more associated public keys, encrypt data that can only be decrypted by an associated public key, and/or digitally sign data or transactions. On the other hand, a public key can be employed to decrypt data encrypted by an associated private key, encrypt data that only the private key can decrypt, and/or digitally authenticate a digital signature generated by an associated private key.

In various embodiments, a transaction generated by a node, such as primary node 300, can be communicated from the node to one or more nodes of the distributed ledger network 400. In some embodiments, a transaction received by a node, such as secondary node 380a of FIG. 4, can be passed on to another node, such as secondary node 380b of FIG. 4. Similarly, secondary node 380b can pass on the received transaction to another node, such as secondary node 380c of FIG. 4. In this regard, a transaction communicated from one node to another node of the distributed ledger network 400 can be passed on to other nodes until the transaction has propagated throughout the entire distributed ledger network 400. In some embodiments, however, a transaction is not finalized (i.e., added to the blockchain) until the transaction is validated by a consensus of nodes 300, 380a-c in the distributed ledger network 400.

In some embodiments, a node 380, 380a-c can validate a received transaction based on a determination that the transaction has been digitally signed by a known or authorized private key, such as one associated with the primary node 300, or one associated with an authorized user account. In some aspects, each node of the distributed ledger network 400 can determine that a transaction was digitally signed with a private key associated with the primary node 300 based on a provided or identified public key of the primary node 300. In some implementations, a public key of the primary node can be defined in each dataset consensus component 342, or can be defined on the blockchain to be easily determined by any node of the distributed ledger network 400. In some other aspects, each node of the distributed ledger network 400 can determine that a transaction was digitally signed with a private key associated with an authorized user account based on the public key of each user account being securely shared (e.g., communicated) between the nodes 300, 380a-c of the distributed ledger network 400.

If a node 300, 380a-c in the distributed ledger network 400 determines that a transaction is not valid (i.e., is not an authorized transaction), the transaction is determined invalid by the node and the transaction is not passed on (e.g., communicated) to other nodes to which it is connected. On the other hand, if a node 300, 380a-c determines that a transaction is valid (i.e., is signed with an authorized key), the node passes on (e.g., communicates) the transaction, along with an indication that the node independently validated the transaction, to any other node 300, 380a-c to which it is connected. As the nodes 300, 380a-c in the distributed ledger network 400 are all directly or indirectly connected to one another, this validation process continues until the nodes collectively determine that a consensus has validated the transaction. The collective determination of consensus can be facilitated by virtue of each node maintaining a list of other nodes on the network (e.g., by I.P. address or other identifier) along with their respective determinations of transaction validity.

In some embodiments, after a consensus of validity for a transaction has been reached by the nodes 300, 380a-c, the transaction can be added to the blockchain. In some embodiments, a validated transaction must await confirmation before it is added to the blockchain. As the nodes 300, 380a-c can be peers with one another, any node can participate in the process of adding the transaction to the blockchain. For purposes of background, the blockchain includes validated transactions that are grouped into a cryptographically chained series of blocks, whereby each block includes a subset of these transactions. In some embodiments, any node 300, 380a-c can perform the process of block generation, which can be implemented in a variety of ways based on a consensus algorithm executed by the dataset consensus component 342 including, but not limited to, proof of work, proof of stake, proof of authority, practical Byzantine Fault Tolerance, or Federated Byzantine Agreements. As the aforementioned processes for block generation are generally known in the art, additional detail for these processes are not described herein. It is contemplated, however, that any implementation of block generation and consensus determination can be employed in accordance with the present disclosure. More importantly, as the general outcome of block generation is relatively similar among these implementations, the following description is provided irrespective of the block generation aspect of the consensus module.

To add a validated transaction to the blockchain, the transaction must first be included into a block that is being generated by one of the nodes 300, 380a-c and subsequently validated by a consensus of the nodes in the distributed ledger network 400. The transaction can be independently included into a block, or grouped together with other transactions, either of which are included within the purview of the present disclosure. Such implementations may vary, however, based on design considerations of the dataset consensus component 342 and/or a block size (i.e., memory limitation) implemented or defined within in the dataset consensus component 342 of the nodes 300, 380a-c. In various embodiments, a node generating a block must also include, into the block it is generating, a cryptographic hash of the block most-recently added to the blockchain. Once generated in accordance with any consensus rules defined by the dataset consensus component 342, a node generating a block can send the generated block to any of the nodes to which it is connected.

In some embodiments, nodes receiving the generated block can verify that the block includes one or more valid transactions, includes a hash value of a block most-recently added to the blockchain, and was generated in accordance with the defined consensus rules. Upon verifying the foregoing, each node 300, 380a-c can pass on (e.g., communicate) the verified block to its neighboring node(s). In this way, and similar to how a transaction is validated by a determined consensus of the distributed ledger network 400, a generated block including at least the transaction can be verified by another determined consensus of the nodes. When a determination is made that a consensus of the nodes 300, 380a-c has verified a block, the newly-verified block is added by each of the nodes 300, 380a-c to its respective copy of the blockchain immediately subsequent to the previously-added block, the hash of the previously-added block being included in the newly-verified block. In this regard, each block can be cryptographically "chained" to a previous block and a subsequent block. In other words, the cryptographic hashes can immutably enforce the order and accuracy of transactions stored on the blockchain. In some embodiments, each respective copy of the blockchain maintained by a node can be accessed by the node, any other node, or in some further embodiments, a client device such as client device 500 of FIG. 1. In this regard, the blockchain can be provided as a transparent record of transactions, that can be cross-referenced in a variety of manners, whether for purposes of auditing, verifying, or simply referencing transactions that have been performed on or in association with certified farming datasets.

Figure 5:
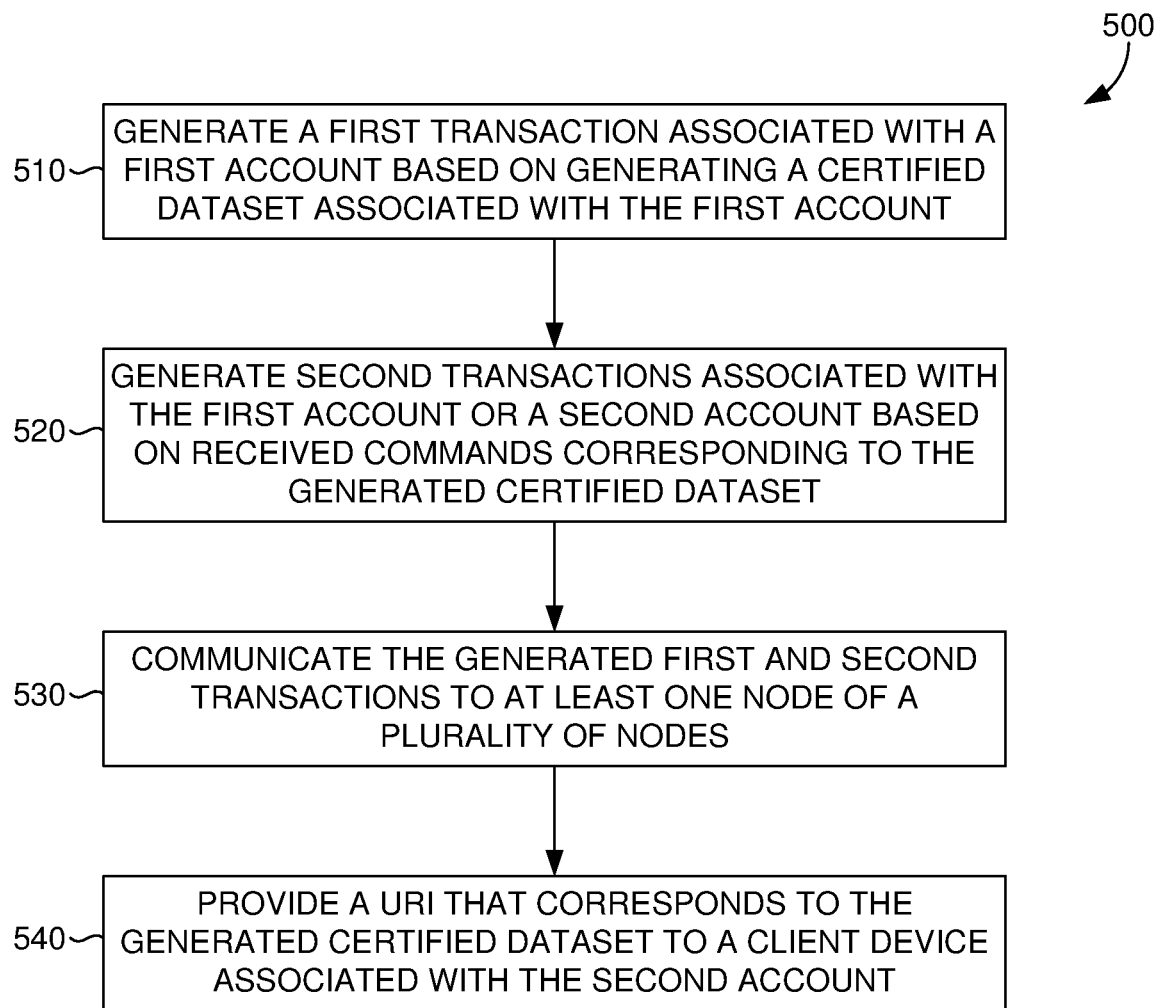
FIG. 5 is a flow diagram showing a method for securing certified datasets utilizing distributed transactions in accordance with some embodiments of the present disclosure.

Turning now to FIG. 5, a flow diagram 500 is provided that illustrates a method for securing electronic agricultural datasets utilizing distributed transactions in accordance with some embodiments of the present disclosure. As described in accordance with FIG. 3, a computing device, such as primary node 300 of FIGS. 1 and 3, can receive collected data associated with a first account (e.g., a first user account), such as a set of raw farming data collected by data collection device 200 of FIGS. 1 and 2. The collected data can include sensor data obtained by various sensors coupled or not coupled to farming machinery or implements, by way of non-limiting example. In some embodiments, the collected data can be tagged by the data collection device to include detected location information, time stamps, a unique identifier of the data collection device, the first account associated with the data collection device, and/or other generated metadata, among other things. The collected data can be communicated from the data collection device to the primary node and received by the primary node. In some embodiments, the primary node can interpret and/or partition the received collected data into independent portions, such as portions of the collected data that may be related to a particular task, location, or time period, among other things. In various embodiments, the collected data can include raw farming data and/or non-certified farming data, among other things.

In some instances, the primary node can receive, from a client device (e.g., client device 500 of FIG. 1) associated with the first account, a selection that corresponds to a particular portion of the received collected data. For instance, the client device can display, via a GUI, one or more portions of the collected data as described herein, and receive an input that corresponds to one of the displayed portions. The primary node can further receive, from the client device or other computing device, certification data and/or other data associated with the selected portion of the received collected data. In various embodiments, the received certification data and/or other data can include relevant information associated with the selected portion, relevant information which may not be detected by the data collection device. For instance, the certification data and/or other data can include crop and seed variety data, which can be relevant to a particular task associated with the selected portion of the received collected data, among other things.

In some embodiments, the primary node can generate a certified dataset associated with the first account, such as a certified farming dataset generated by dataset certification component 316 of FIG. 3, based on the selected portion of received collected data and the received certification data and/or other data associated with the selected portion. In some embodiments, the primary node can store any portion of obtained data as an electronic agricultural dataset (e.g., the collected and/or interpreted set of raw farming data, non-certified farming data, or the generated certified dataset) to a memory, such as datastore 350 of FIG. 1. In some further embodiments, based on the electronic agricultural dataset being generated and/or stored, the primary node can determine and generate one or more cryptographic hashes (e.g., a digital fingerprint) that corresponds to any one or more electronic agricultural datasets, as described in accordance with hash generating component 318 of FIG. 3, among other places.

Based on an electronic agricultural dataset (e.g., a certified farming dataset) being generated and/or stored, at step 510, the primary node can generate a first transaction (e.g., an electronic dataset) in association with the first account. In some embodiments, the generated first transaction can include the hash(es) of one or more electronic agricultural datasets. In some further embodiments, the generated first transaction can also include any portion of the received corresponding certification data, non-certified farming data, other associated data, and/or any portion of metadata associated with the collected and/or interpreted set of raw farming data and/or the generated certified dataset. In some aspects, the associated metadata can include characteristics that describe features of the electronic agricultural dataset (e.g., location, time frame, user account).

In some further embodiments, the primary node can enable the electronic agricultural dataset to be listed on a data exchange marketplace, such as one provided by dataset exchange component 322 of FIG. 3. In this regard, the client device associated with the first account can send the primary node a command to list the electronic agricultural dataset. As such, the primary node can flag the electronic agricultural dataset to be listed on the data exchange marketplace, so that the electronic agricultural dataset is listed, searchable, and/or available for selection by other user accounts for purposes of generating offers to purchase or license the electronic agricultural dataset from the first account.

At step 520, the primary node can generate a second transaction for each command corresponding to the electronic agricultural dataset and received via the data exchange marketplace. For instance, a client device associated with a second account can communicate, to the primary node, a command to generate an offer for the electronic agricultural dataset listed on the data exchange marketplace. In some aspects, the command can include a request to license or purchase the electronic agricultural dataset for a defined amount. As such, the primary node can generate the offer on behalf of the second account based on the received command and communicate the offer to a client device associated with the first account. To this end, the client device associated with the first account can receive the offer, and in response, communicate to the primary node a different command to generate one of an acceptance or a rejection to the received offer. For each of the received commands, including any one of an offer to license or purchase, or a rejection or acceptance to the offer, the primary node can generate a corresponding second transaction associated with the account from which the command was received. In some aspects, a second transaction can be digitally signed with a private key associated with the account from which a command was received, or can simply include an indication that the transaction was generated based on the command received from the account.

At step 530, the primary node can communicate the generated first transaction and each generated second transaction to one or more nodes of a plurality of nodes configured to maintain a distributed ledger, such as a blockchain. In various embodiments, the generated first transaction can be communicated concurrently with, in response to, and/or based on step 510, and each generated second transaction can be communicated concurrently with, in response to, and/or based on step 520. As described in accordance with node component 340 of FIG. 3, and the distributed ledger network 400 of FIG. 4, the plurality of nodes including the primary node and a plurality of secondary nodes, such as secondary node 380 of FIG. 1 or 380a-c of FIG. 4, can be configured to obtain any transaction communicated from the primary node to another node of the plurality of nodes, such as nodes 380a-c of FIG. 4. The plurality of nodes can, among other things, independently or collectively validate the transaction, generate a block that includes the transaction, and store the block and/or transaction to respective copies of the distributed ledger stored in respective memories thereof.

At step 540, the primary node can determine whether the second account is to be provided with authorized access to the electronic agricultural dataset stored in the memory or datastore based on the transactions stored on the distributed ledger. More specifically, the primary node can analyze the distributed ledger by searching for any transaction that may include a hash that corresponds to the electronic agricultural dataset. The primary node can parse these transactions, and further determine which transactions are associated with the second account. In some aspects, a transaction can be associated with the second account based on the primary node determining that the transaction is digitally signed with a private key of the second account, that the transaction includes an indication that the transaction was generated based on a command associated with the second account, or if the transaction references another transaction (e.g., an offer transaction) that was generated based on a command associated with the second account. In some aspects, if the primary node determines that the stored first transaction is associated with the second account, then the primary node can determine that the second account is an owner of the generated certified dataset and can thus have authorized access thereto. In some other aspects, if the primary node determines that the stored first transaction is not associated with the second account, the primary node can evaluate the set of stored second transactions to determine whether one of the set of stored second transactions is an offer transaction associated with the second account, and that another one of the set of stored second transactions is an acceptance transaction associated with the first account, also referencing the offer transaction associated with the second account. In this way, the primary node can determine that the second account has lawfully purchased or licensed the electronic agricultural dataset, and can thus be provided with authorized access to the electronic agricultural dataset. As such, the primary node can generate a URI that corresponds to a storage location of the electronic agricultural dataset stored in the memory or datastore. In some aspects, the generated URI can be unique to the second account, such that access to the URI requires valid credentials associated with the second account in order to facilitate access to the electronic agricultural dataset.

In some further embodiments, the primary node can detect each instance of the generated URI being accessed by a client device, such as one associated with the second account or any other account that may or may not have authorized access to the electronic agricultural dataset associated with the generated URI. In some aspects, the primary node can generate a transaction for each detected access attempt, including in the transaction detected characteristics of the access attempt, such as provided credentials, an IP address or location of the client device, a time of the attempt, and the like, without limitation. Similarly, the generated transaction can be communicated to any node of the plurality of nodes, so that the plurality of nodes can store the generated transaction to the distributed ledger. In this way, as described in accordance with ledger analyzing component 324 of FIG. 3, the primary node can generate various analytics corresponding to the electronic agricultural dataset. For instance, a provenance chain that reflects the generation, each offer, sale, license, exchange, access attempt, and any other operation on or associated with an electronic agricultural dataset can be provided to any user account having an association to the electronic agricultural dataset. In some aspects, the generated analytics can be limited to transactions directly associated with a user account (e.g., transactions generated based on commands received from a client device associated with the user account).

In some further embodiments, the primary node can also generate notifications based on detected unauthorized usage of an electronic agricultural dataset stored in memory or the datastore. For instance, the primary node can obtain an electronic agricultural dataset (e.g., a collected and/or interpreted set of raw farming data and/or a certified dataset) based on a received input, such as a file of the electronic agricultural dataset or a URI corresponding thereto and can further determine a hash(es) of the obtained electronic agricultural dataset. The primary node can cross reference the determined hash(es) with the hashes determined for each electronic agricultural dataset stored in the memory or datastore. For any determined matching hash, the primary node can generate a notification that is provided to an original owner (e.g., the first account) of the electronic agricultural dataset, or prohibit a listing of the obtained electronic agricultural dataset to the data exchange marketplace, among other things.

Figure 6:
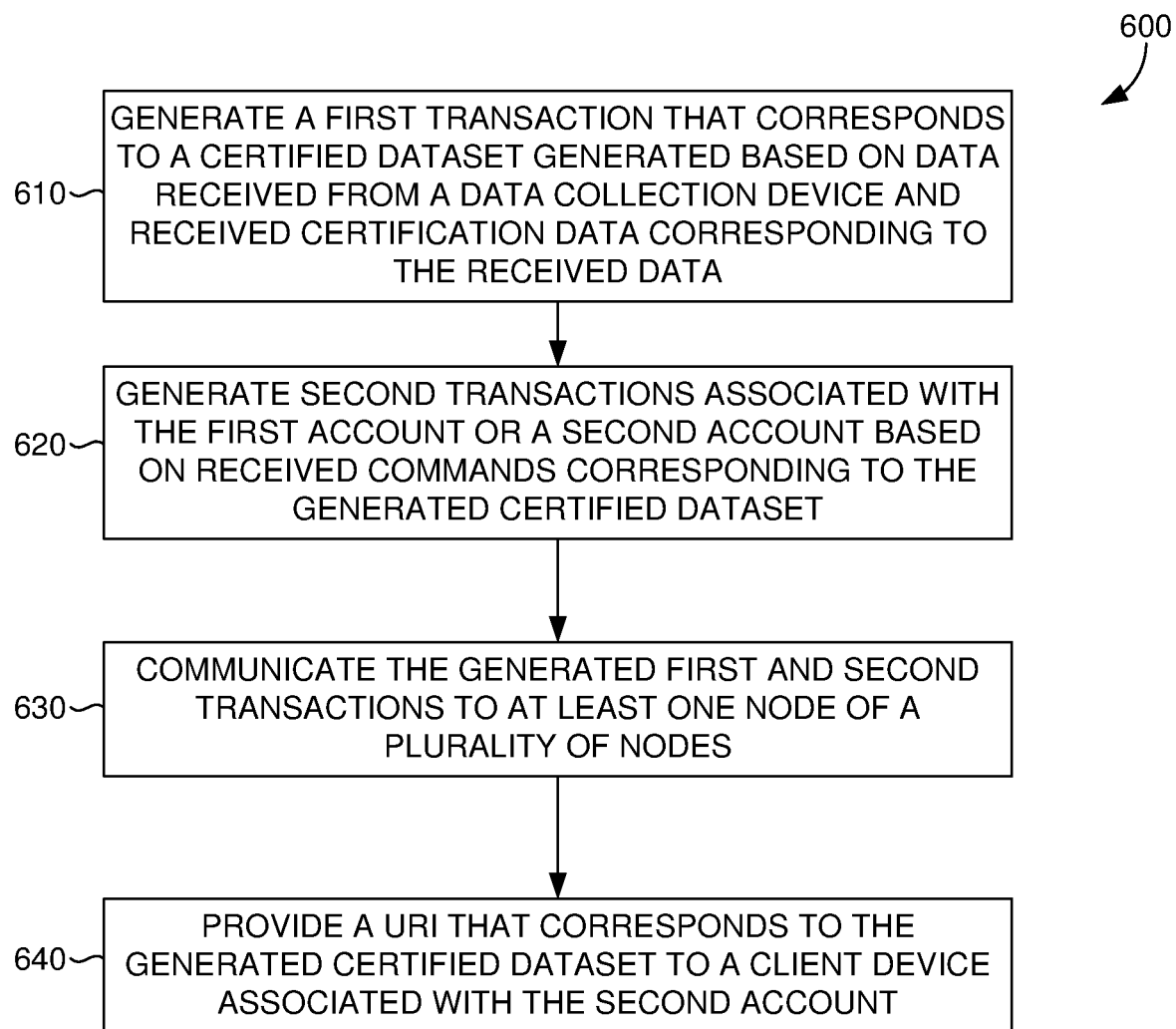
FIG. 6 is a flow diagram showing another method for securing certified datasets utilizing distributed transactions in accordance with some embodiments of the present disclosure.

Referring now to FIG. 6, a flow diagram 600 is provided that illustrates another method for securing electronic agricultural datasets utilizing distributed transactions in accordance with some embodiments of the present disclosure. As described in accordance with FIG. 3, a computing device, such as primary node 300 of FIGS. 1 and 3, can receive data associated with a first account (e.g., a first user account), such as raw farming data, non-certified farming data, or other associated data collected by, for instance, data collection device 200 of FIGS. 1 and 2. The collected data can include sensor data obtained by various sensors separate from and/or coupled to farming machinery or implements, by way of non-limiting example. In some embodiments, the collected data can be tagged by a respective data collection device to include detected location information, time stamps, a unique identifier of the data collection device, a reference to the first account associated with the data collection device, and/or other metadata determined or generated by the data collection device, among other things. The collected data can be continuously, periodically, or manually communicated over a network, from the data collection device to the primary node. In some embodiments, the primary node can partition and/or interpret the received collected data into independent portions, such as portions of the collected data that may be related to a particular task (e.g., a farming task), location, or time period, among other things. In some instances, the primary node can receive, from a client device (e.g., client device 500 of FIG. 1) associated with the first account, a selection that corresponds to a particular portion of the received and/or interpreted collected data (e.g., a particular set of collected raw farming data). In some aspects, various portions can be determined by the primary node based on received parameters (e.g., location, time period) provided by the client device associated with the first account.

In some embodiments, the primary node can further receive, from the client device, certification data and/or other data (e.g., non-certified data) that corresponds to a selected portion of the received collected data. In some aspects, the primary node can determine that the non-certified data is associated with or corresponds to the selected portion based on common characteristics there between (e.g., location, time). In various embodiments, the received certification data and/or other data can include relevant information associated with the selected portion, relevant information which may not be detected by the data collection device. For instance, the certification data and/or other associated data can include crop type data, seed variety data, application data, soil data, nutrient data, weather data, swath width data, or other chemical data, among other things, which may be relevant to a particular task (e.g., farming task) associated with the selected portion of the received collected data.

In some embodiments, the primary node can generate a certified dataset associated with the first account, such as a certified farming dataset generated by dataset certification component 316 of FIG. 3, based on the selected portion of received collected data and the received certification data corresponding to the selected portion. In some embodiments, the primary node can store the electronic agricultural dataset (e.g., the generated certified farming dataset) to a memory, such as datastore 350 of FIG. 1. In some further embodiments, based on the electronic agricultural dataset being generated and/or stored, the primary node can determine and generate one or more cryptographic hashes (e.g., a digital fingerprint) that corresponds to any portion of the electronic agricultural dataset, as described in accordance with hash generating component 318 of FIG. 3, among other places.

Based on the electronic agricultural dataset (e.g., certified farming dataset) being generated and/or stored, at step 610, the primary node can generate a first transaction in association with the first account. In some embodiments, the generated first transaction can include the hash(es) of the electronic agricultural dataset(s). In some further embodiments, the generated first transaction can also include any portion of the received corresponding certification data, other associated data, non-certified farming data, and/or any portion of metadata associated with the electronic agricultural dataset. In some aspects, the associated metadata can include characteristics that describe features of the electronic agricultural dataset (e.g., location, time frame, user account).

In some further embodiments, the primary node can enable the electronic agricultural dataset to be listed on a data exchange marketplace, such as one provided by dataset exchange component 322 of FIG. 3. In this regard, the client device associated with the first account can send the primary node a command to list the electronic agricultural dataset. As such, the primary node can flag the electronic agricultural dataset to be listed on the data exchange marketplace, so that the generated certified dataset is listed, searchable, and/or available for selection by other user accounts for purposes of generating offers to purchase or license the electronic agricultural dataset from the first account.

At step 620, the primary node can generate a second transaction for each command or operation corresponding to the electronic agricultural dataset and received via the data exchange marketplace. For instance, a client device associated with a second account can communicate, to the primary node, a command to generate an offer for the electronic agricultural dataset listed on the data exchange marketplace. In some aspects, the command can include a request to license or purchase the electronic agricultural dataset for a defined amount. As such, the primary node can generate the offer on behalf of the second account based on the received command and communicate the offer to a client device associated with the first account. To this end, the client device associated with the first account can receive the offer, and in response, communicate to the primary node a different command to generate one of an acceptance or a rejection to the received offer. For each of the received commands, including any one of an offer to license or purchase, or a rejection or acceptance to the offer, the primary node can generate a corresponding second transaction associated with the account from which the command was received. In some aspects, a second transaction can be digitally signed with a private key associated with the account from which a command was received, or can simply include an indication that the transaction was generated based on the command received from the account.

At step 630, the primary node can communicate the generated first transaction and each generated second transaction to one or more nodes of a plurality of nodes configured to maintain a distributed ledger, such as a blockchain. In various embodiments, the generated first transaction can be communicated concurrently with, in response to, and/or based on step 610, and each generated second transaction can be communicated concurrently with, in response to, and/or based on step 620. As described in accordance with node component 340 of FIG. 3, and the distributed ledger network 400 of FIG. 4, the plurality of nodes including the primary node and a plurality of secondary nodes, such as secondary node 380 of FIG. 1 or 380a-c of FIG. 4, can be configured to obtain any transaction communicated from the primary node to another node of the plurality of nodes, such as nodes 380a-c of FIG. 4. The plurality of nodes can, among other things, independently or collectively validate the transaction, generate a block that includes the transaction, and store the block and/or transaction to respective copies of the distributed ledger stored in respective memories thereof.

At step 640, the primary node can determine whether the second account is to be provided with authorized access to the electronic agricultural dataset stored in the memory or datastore based on the transactions stored on the distributed ledger. More specifically, the primary node can analyze the distributed ledger by searching for any transaction that may include a hash(es) that corresponds to the electronic agricultural dataset. The primary node can parse these transactions, and further determine which transactions are associated with the second account. In some aspects, a transaction can be associated with the second account based on the primary node determining that the transaction is digitally signed with a private key of the second account, that the transaction includes an indication that the transaction was generated based on a command associated with the second account, or if the transaction references another transaction (e.g., an offer transaction) that was generated based on a command associated with the second account. In some aspects, if the primary node determines that the stored first transaction is associated with the second account, then the primary node can determine that the second account is an owner of the electronic agricultural dataset and can thus have authorized access thereto. In some other aspects, if the primary node determines that the stored first transaction is not associated with the second account, the primary node can evaluate the set of stored second transactions to determine whether one of the set of stored second transactions is an offer transaction associated with the second account, and that another one of the set of stored second transactions is an acceptance transaction associated with the first account, also referencing the offer transaction associated with the second account. In this way, the primary node can determine that the second account has lawfully purchased or licensed the electronic agricultural dataset and can thus be provided with authorized access to the electronic agricultural dataset. As such, the primary node can generate a URI that corresponds to a storage location of the electronic agricultural dataset stored in the memory or datastore. In some aspects, the generated URI can be unique to the second account, such that access to the URI requires valid credentials associated with the second account in order to facilitate access to the electronic agricultural dataset.

In some further embodiments, the primary node can detect each instance of the generated URI being accessed by a client device, such as one associated with the second account or any other account that may or may not have authorized access to the electronic agricultural dataset associated with the generated URI. In some aspects, the primary node can generate a transaction for each detected access attempt, including in the transaction detected characteristics of the access attempt, such as provided credentials, an IP address or location of the client device, a time of the attempt, and the like, without limitation. Similarly, the generated transaction can be communicated to any node of the plurality of nodes, so that the plurality of nodes can store the generated transaction to the distributed ledger. In this way, as described in accordance with ledger analyzing component 324 of FIG. 3, the primary node can generate various analytics corresponding to the electronic agricultural dataset. For instance, a provenance chain that reflects the generation, each offer, sale, license, exchange, access attempt, and any other operation on or associated with an electronic agricultural dataset can be provided to any user account having an association to the electronic agricultural dataset. In some aspects, the generated analytics can be limited to transactions directly associated with a user account (e.g., transactions generated based on commands received from a client device associated with the user account).

In some further embodiments, the primary node can also generate notifications based on detected unauthorized usage of an electronic agricultural dataset stored in memory or the datastore. By way of example, the primary node can receive or retrieve an electronic agricultural dataset based on a received input, such as a file of the set of collected and/or interpreted raw farming data and/or a certified farming dataset, or a URI corresponding thereto, and can further determine a hash(es) thereof. The primary node can cross reference the determined hash(es) with the hashes determined for each electronic agricultural dataset stored in the memory or datastore. For any determined matching hash, the primary node can generate a notification that is provided to an original owner (e.g., the first account) of the determined corresponding or matching electronic agricultural dataset, or prohibit a listing of the received or retrieved electronic agricultural dataset to the data exchange marketplace, among other things.

Having described embodiments of the present disclosure, an exemplary operating environment in which embodiments of the present disclosure may be implemented is described below in order to provide a general context for various aspects of the present disclosure. Referring initially to FIG. 7 in particular, an exemplary operating environment for implementing embodiments of the present disclosure is shown and designated generally as computing device 700. Computing device 700 is but one example of a suitable computing environment and is not intended to suggest any limitation as to the scope of use or functionality of the described embodiments. Neither should the computing device 700 be interpreted as having any dependency or requirement relating to any one or combination of components illustrated.

The various embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The various embodiments may be practiced in a variety of system configurations, including hand-held devices, consumer electronics, general-purpose computers, more specialty computing devices, etc. The various embodiments may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present disclosure provide for, among other things, tracking the provenance of electronic agricultural datasets (e.g., collected, generated, or processed machine or agronomic data) to provide secured access to authorized user accounts, provide auditability of the electronic agricultural datasets, and also enable transactional oversight of the electronic agricultural datasets exchanged between authorized user accounts. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that the described embodiments are one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter described in the present disclosure is provided with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer storage medium storing computer-useable instructions that, when used by one or more processors, cause the one or more processors to:
   receive a first transaction associated with a first account from a primary node based on a unique dataset associated with the first account being generated at the primary node;
   receive a set of second transactions that are each associated with one of the first account and a second account from the primary node based on commands corresponding to the unique dataset being received at the primary node, wherein the received commands are each associated with one of the first account and the second account;
   determine that each transaction of the received first transaction and the received set of second transactions is valid based on a public key associated with one of the first account or the second account; and
   cause the primary node to determine that the second account can access the unique dataset based at least in part on the determination that the transactions are valid.

2. The medium of claim 1, wherein the unique dataset is a certified dataset.

3. The medium of claim 1, wherein the instructions further cause the one or more processors to:
   based at least in part on the determination that the transactions are valid, cause the primary node to generate a URI that corresponds to the unique dataset.

4. The medium of claim 3, wherein the instructions further cause the one or more processors to:
   store each transaction of the received first transaction and the received set of second transactions to a distributed ledger based on the determination that the transaction is valid,
   wherein the primary node is caused to generate the URI based further on the transactions being stored to the distributed ledger.

5. The medium of claim 1, wherein the primary node is configured to generate the unique dataset based on collected data associated with the first account.

6. The medium of claim 1, wherein the collected data is received from a data collection device associated with the first account.

7. The medium of claim 6, wherein the collected data is geo-tagged by the data collection device.

8. The medium of claim 6, wherein the collected data includes agronomic data and/or machinery data obtained from a set of agronomic sensors and/or machine sensors coupled to the data collection device.

9. The medium of claim 6, wherein the unique dataset further includes metadata having at least one of location data and temporal data generated by the data collection device.

10. The medium of claim 1, wherein the unique dataset further includes at least one of crop type data, seed variety data, and other metadata.

11. The medium of claim 1, wherein the received portion is selected from a set of portions determined from the received collected data, each portion of the set of portions being determined based on corresponding metadata included therein.

12. A computer-implemented method for securing certified datasets utilizing distributed transactions, the method comprising:
    receiving, by a distributed ledger node, a first transaction associated with a first account from a primary node based on a unique dataset associated with the first account being generated at the primary node;
    receiving, by the distributed ledger node, a set of second transactions that are each associated with one of the first account and a second account from the primary node based on commands corresponding to the unique dataset being received at the primary node, wherein the received commands are each associated with one of the first account and the second account;
    determining, by the distributed ledger node, that each transaction of the received first transaction and the received set of second transactions is valid based on a public key associated with one of the first account or the second account; and
    causing, by the distributed ledger node, the primary node to determine that the second account can access the unique dataset based at least in part on the determination that the transactions are valid.

13. The method of claim 12, wherein the unique dataset is a certified dataset.

14. The method of claim 12, further comprising:
    based at least in part on the determination that the transactions are valid, causing, by the distributed ledger node, the primary node to generate a URI that corresponds to the unique dataset.

15. The method of claim 14, further comprising:
    storing, by the distributed ledger node, each transaction of the received first transaction and the received set of second transactions to a distributed ledger based on the determination that the transaction is valid,
    wherein the primary node is caused to generate the URI based further on the transactions being stored to the distributed ledger.

16. The method of claim 12, wherein the primary node is configured to generate the unique dataset based on collected data associated with the first account.

17. The method of claim 12, wherein the collected data is received from a data collection device associated with the first account.

18. The medium of claim 17, wherein the collected data is geo-tagged by the data collection device.

19. A system comprising:
    at least one processor, and
    a non-transitory computer storage medium storing computer-useable instructions that, when used by the at least one processor, cause the at least one processor to:
    receive a first transaction associated with a first account from a primary node based on a unique dataset associated with the first account being generated at the primary node;
    receive a set of second transactions that are each associated with one of the first account and a second account from the primary node based on commands corresponding to the unique dataset being received at the primary node, wherein the received commands are each associated with one of the first account and the second account;
    determine that each transaction of the received first transaction and the received set of second transactions is valid based on a public key associated with one of the first account or the second account; and cause the primary node to determine that the second account can access the unique dataset based at least in part on the determination that the transactions are valid.

20. The system of claim 19, wherein the unique dataset is a certified dataset.

\* \* \* \* \*